United States Patent
Katou et al.

(10) Patent No.: US 9,496,725 B2
(45) Date of Patent: Nov. 15, 2016

(54) POWER CONTROL APPARATUS, METHOD, PROGRAM, AND INTEGRATED CIRCUIT, AND STORAGE BATTERY UNIT

(75) Inventors: Tomomi Katou, Shizuoka (JP); Minoru Takazawa, Osaka (JP); Takahiro Kudoh, Kyoto (JP); Kei Murayama, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 639 days.

(21) Appl. No.: 13/997,454

(22) PCT Filed: Mar. 27, 2012

(86) PCT No.: PCT/JP2012/002093
§ 371 (c)(1),
(2), (4) Date: Jun. 24, 2013

(87) PCT Pub. No.: WO2012/132397
PCT Pub. Date: Oct. 4, 2012

(65) Prior Publication Data
US 2013/0285610 A1    Oct. 31, 2013

(30) Foreign Application Priority Data
Mar. 31, 2011 (JP) .................. 2011-080797

(51) Int. Cl.
*H02J 7/00* (2006.01)
*H01M 10/42* (2006.01)
(Continued)

(52) U.S. Cl.
CPC .......... *H02J 7/0021* (2013.01); *H01M 10/42* (2013.01); *H01M 10/425* (2013.01);
(Continued)

(58) Field of Classification Search
CPC ............................. Y02T 90/127; Y02T 90/14
USPC .................................... 701/22; 320/109, 125
See application file for complete search history.

(56) References Cited

U.S. PATENT DOCUMENTS 7,663,344 B2    2/2010  Le Gall et al.
2004/0230343 A1*  11/2004  Zalesski ............ H02J 1/102
                                                    700/297
(Continued)

FOREIGN PATENT DOCUMENTS

| JP | 61-273178 | 12/1986 |
| JP | 8-140285 | 5/1996 |

(Continued)

OTHER PUBLICATIONS

International Search Report issued Jun. 19, 2012 in International Application No. PCT/JP2012/002093.

(Continued)

*Primary Examiner* — Drew A Dunn
*Assistant Examiner* — Zixuan Zhou
(74) *Attorney, Agent, or Firm* — Wenderoth, Lind & Ponack, L.L.P.

(57) ABSTRACT

A control apparatus includes: a target value obtaining unit obtaining a total target value of power to be discharged from storage batteries; an SOH obtaining unit obtain information on a state of health for each of the storage batteries; a charge control unit determining how the power of the total target value is divided among and discharged from each of the storage battery. The charge control unit (i) compares the state of health of a first storage battery and the state of health of a second storage battery, and, in the case where the state of health of the second storage battery is higher than the state of health of the first storage battery, (ii) discharges from the second storage battery second power lower than first power which is discharged from the first storage battery.

12 Claims, 25 Drawing Sheets

(51) Int. Cl.
*H02J 7/02* (2016.01)
*H01M 10/44* (2006.01)
*H02J 3/32* (2006.01)
*H02J 7/35* (2006.01)

(52) U.S. Cl.
CPC ..... *H01M 10/4207* (2013.01); *H01M 10/441* (2013.01); *H02J 7/0018* (2013.01); *H02J 7/0068* (2013.01); *H02J 7/022* (2013.01); *H01M 2010/4271* (2013.01); *H01M 2010/4278* (2013.01); *H02J 3/32* (2013.01); *H02J 7/35* (2013.01)

(56) References Cited

U.S. PATENT DOCUMENTS

2005/0156574 A1* 7/2005 Sato ................. H02H 7/18
320/134

2007/0222418 A1 9/2007 Le Gall et al.
2012/0109443 A1* 5/2012 Takahashi ............... B60L 1/003
701/22

FOREIGN PATENT DOCUMENTS

| | | |
|---|---|---|
| JP | 10-117447 | 5/1998 |
| JP | 2008-503039 | 1/2008 |
| JP | 2008-118790 | 5/2008 |
| JP | 2008-187865 | 8/2008 |
| JP | 2010-28886 | 2/2010 |
| JP | 2011-15520 | 1/2011 |
| WO | 2006/003287 | 1/2006 |

OTHER PUBLICATIONS

Office Action mailed Feb. 17, 2015 in corresponding Chinese patent application No. 201280004356.1 (with English translation).
English translation of JP 61-273178 previously cited in IDS filed on Jun. 24, 2013.

* cited by examiner (Characteristic of power converter at rated value 22)

|  | Output/Input (kW) |
|---|---|
| Conversion with 4kW = 90 % | 3.6/4.0 |
| Conversion with 3kW = 86 % | 2.6/3.0 |
| Conversion with 2kW = 80 % | 1.6/2.0 |
| Conversion with 1kW = 50 % | 0.5/1.0 |

|  | Output/Input (kW) |
|---|---|
| Conversion with 2kW = 90 % | 1.8/2.0 |
| Conversion with 1kW = 80 % | 0.8/1.0 |

|  | Output/Input (kW) |
|---|---|
| Conversion with 1kW = 90 % | 0.9/1.0 |

FIG. 17

(a) If x = 3
(1) 3kW at A1 (86%)   Output of 2.6kW → Loss of 0.4kW
(2) 2kW at B1 (90%)   Output of 1.8kW
    1kW at A2 (80%)   Output of 0.8kW ⇒ Loss of 0.4kW
(3) 2kW at B1 (90%)   Output of 1.8kW
    1kW at B2 (90%)   Output of 0.9kW ⇒ Loss of 0.3kW Select (3) which is high in efficiency and small in loss (b) If x = 2
(1) 2kW at B1 (90%)   Output of 1.8kW ⇒ Loss of 0.2kW
(2) 1kW at B1 (80%)   Output of 0.8kW
    1kW at A2 (80%)   Output of 0.8kW ⇒ Loss of 0.4kW
(3) 1kW at B1 (80%)   Output of 0.8kW
    1kW at B2 (90%)   Output of 0.9kW ⇒ Loss of 0.3kW Select (1) which is high in efficiency and small in loss

```
                              Output/Input (kW)
Conversion with 4kW  = 90 %   3.6/4.0
Conversion with 3kW  = 86 %   2.6/3.0
Conversion with 2kW  = 80 %   1.6/2.0
Conversion with 1kW  = 50 %   0.5/1.0
```

```
                              Output/Input (kW)
Conversion with 2kW  = 80 %   1.6/2.0
Conversion with 1kW  = 75 %   0.75/1.0
```

```
                              Output/Input (kW)
Conversion with 1kW  = 90 %   0.9/1.0
```

FIG. 20

```
If x = 2   (1) 2kW at B1 (80%)      Output of 1.6kW ⇒ Loss of 0.45kW
           (2) 1kW at B1 (75%)      Output of 0.75kW
               1kW at A2 (75%)      Output of 0.75kW ⇒ Loss of 0.45kW
           (3) 1kW at B1 (75%)      Output of 0.75kW
               1kW at B2 (90%)      Output of 0.9kW ⇒ Loss of 0.35kW Select (3) which is high in efficiency and small in loss
```

POWER CONTROL APPARATUS, METHOD, PROGRAM, AND INTEGRATED CIRCUIT, AND STORAGE BATTERY UNIT

TECHNICAL FIELD

The present invention relates to control of charge and discharge for a storage battery system.

BACKGROUND ART

Recently, there is a system devised to include a storage battery unit installed in buildings such as an ordinary house, an office building, or a factory, and supply power stored in the storage battery unit to an electrical device. The system charges the storage battery unit with the power including surplus power of a utility grid or power generated by a power-generating system using natural energy such as sunlight.

Such a system makes it possible to supply to the electrical device the power stored in its own storage battery unit, as well as the power from the utility grid. This contributes to reducing an electricity expense and $CO_2$ emissions for each building.

There is a known technique devised to charge or discharge with power so that multiple storage batteries have their states of charge (SOC) stabilized in a predetermined range. Hence, the technique maximizes the charging and discharging power of each storage battery (See Patent Literature 1, for example).

CITATION LIST

Patent Literature

[PTL 1]
Japanese Unexamined Patent Application Publication No. 2010-28886

SUMMARY OF INVENTION

Technical Problem

The above technique, however, has the problems as stated below.

A typical storage battery unit includes not only a storage battery but also a power converter for regulating the power that flows in and out of the storage battery. The power converter regulates the power generated by the power-generating system so that the regulated power can be stored in the storage battery. Moreover, the power converter regulates the power discharged from the storage battery so that the discharged power can be used by an electrical device.

It is known that the conversion efficiency of a power converter improves further as the power is converted closer to a rated value, and declines further as the power is converted lower than the rated value.

In contrast, a storage battery deteriorates less quickly as the storage battery is charged or discharged with lower power, and more quickly as the storage battery is charged or discharged with higher power. In particular, the deterioration is obvious in the case of charging power.

Hence, the charge or discharge of the power of the rated value of the power converter could improve the conversion efficiency of the power converter; however, the storage battery of the power converter will quickly deteriorate. In contrast, the charge or discharge of the power lower than the rated value of the power converter could deteriorate the storage battery less quickly; however, the conversion efficiency of the power converter will decline.

In the above known technique, only the state of charge (SOC) for each battery is considered, but not the level of charging or discharging power as described above. Moreover, in the known technique, each of the storage batteries is equally utilized. Hence, the lives of the storage batteries are likely to end at the same time. Consequently, the user will have to replace the whole storage battery unit.

The present invention is conceived in view of the above problems and aims to slow a decrease in the life of the entire storage battery system and improve the conversion efficiency of the entire storage battery system in converting power.

Solution to Problem

In order to solve the above problems, a power control apparatus according to an aspect of the present invention includes: a target value obtaining unit which obtains a total target value of power to be stored in storage batteries; a state obtaining unit which obtains information on a state of health for each of the storage batteries; and a power control unit which determines, for each of the storage batteries, how the power of the total target value is distributed and stored in each storage battery, wherein the power control unit (i) compares the state of health of a first storage battery and the state of health of a second storage battery, and, in the case where the state of health of the second storage battery is higher than the state of health of the first storage battery, (ii) charges the second storage battery with second power lower than first power with which the first storage battery is charged, the first storage battery and the second storage battery being included in the storage batteries.

It is noted that, each of the power converting units may include at least one power converter. For example, the rated value of the power converting units may be, for example, the highest of all the rated values of the power converters.

It is noted that the present invention can be implemented not only as an apparatus, but also an integrated circuit including processing units which the apparatus has, a control method including the processing units that the apparatus has as steps, and a program which causes a computer to execute the steps.

Advantageous Effects of Invention

The present invention determines, for each of storage batteries, power of the target value to be stored, based on a state of health (SOH) of the each of the storage batteries. In other words, the present invention utilizes the rated value of the power converters to determine, based on the SOH of each of the storage batteries, which should be prioritized—that is either the lives of the storage batteries or efficiency in converting power. Such a feature successfully slows a decrease in the life of the entire storage battery system and improves the efficiency of the storage battery system in converting power.

BRIEF DESCRIPTION OF DRAWINGS

FIG. 17 shows efficiency to be specified.

FIG. 20 shows efficiency to be specified.

DESCRIPTION OF EMBODIMENTS

Figure 1:
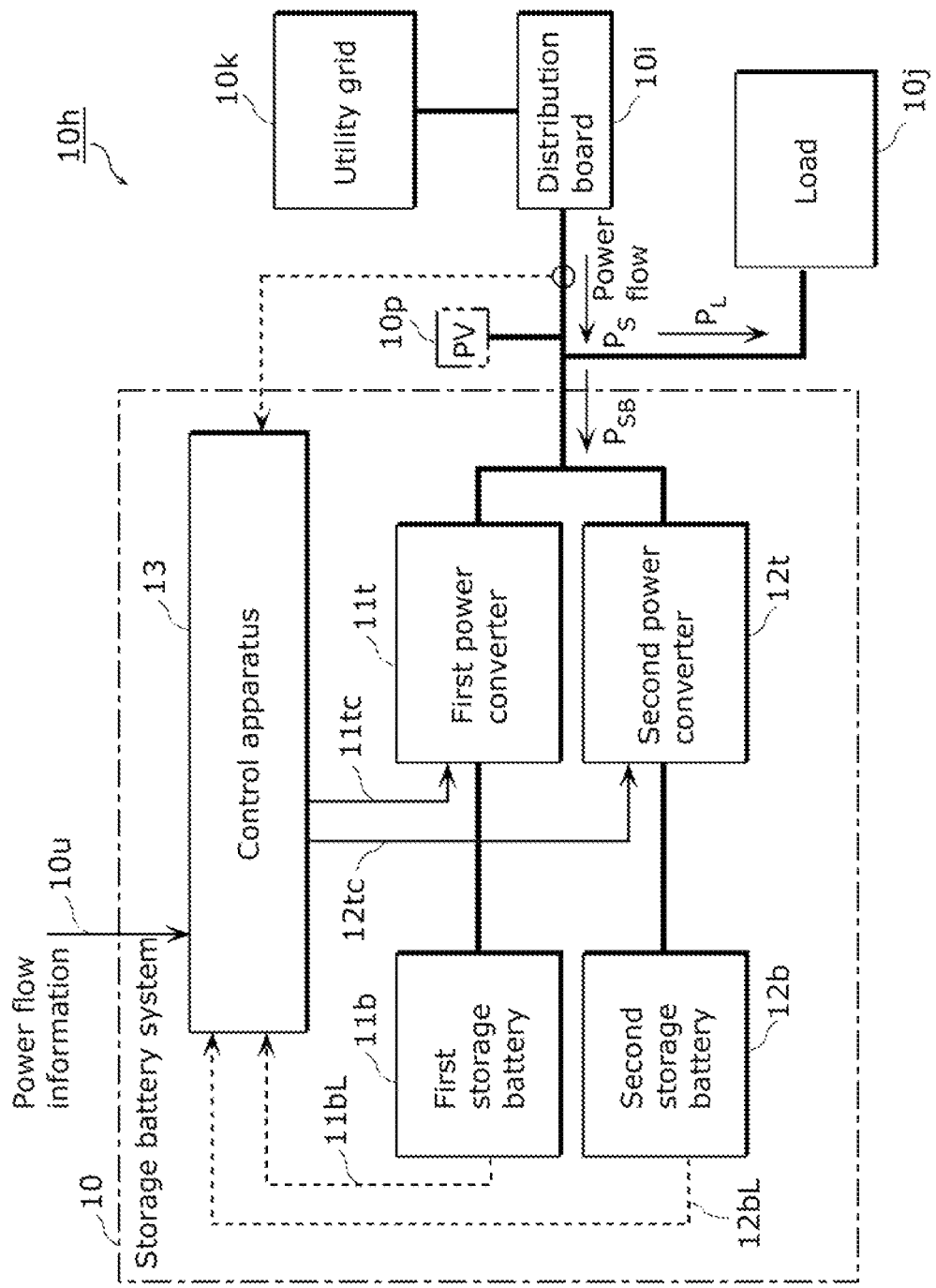
FIG. 1 depicts a system structure diagram of a power supply system according to Embodiment 1.

Described hereinafter are the embodiments of the present invention, with reference to the drawings.

A power control apparatus according to an implementation of the present invention includes: a target value obtaining unit which obtains a total target value of power to be stored in storage batteries; a state obtaining unit which obtains information on a state of health for each of the storage batteries; and a power control unit which determines, for each of the storage batteries, how the power of the total target value is distributed and stored in each storage battery, wherein the power control unit (i) compares the state of health of a first storage battery and the state of health of a second storage battery, and, in the case where the state of health of the second storage battery is higher than the state of health of the first storage battery, (ii) charges the second storage battery with second power lower than first power with which the first storage battery is charged, the first storage battery and the second storage battery being included in the storage batteries The power control apparatus may further include a rated value obtaining unit which obtains a first rated value of a first power converting unit including at least one power converter which receives power supplied from a predetermined generator and provides the power to the first storage battery, wherein the power control unit may (i) compare, based on the state of health of each of the storage batteries, a magnitude relationship between the total target value and the first rated value, and (ii) determine that the first power to be stored in the first storage battery is lower than or equal to one of power of the first rated value and power of the total target value, whichever is smaller.

The rated value obtaining unit may obtain a second rated value of a second power converting unit including at least one power converter for providing power to the second storage battery, and, in the case where a total value of the first rated value and the second rated value is lower than the total target value, the power control unit may (i) cause the first power converting unit to perform power conversion and charge the first storage battery at the first rated value, and (ii) cause the second power converting unit to perform power conversion and charge the second storage battery at the second rated value.

The power control unit may compare the total target value with the first rated value, and charge the first storage battery with the first rated value in the case where the total target value is higher than the first rated value.

The charge control unit may charge the second storage battery with power created by subtracting the first rated value from the total target value, in the case where the total target value is higher than the first rated value.

The power control unit may charge the first storage battery with the power of the total target value in the case where the total target value is lower than the first rated value.

The power control unit may charge the second storage battery with no power in the case where the total target value is lower than the first rated value.

Each of the first converting unit and the second converting unit may include power converters having different rated values including the first rated value and the second rated value, and the power control unit may (i) obtain a magnitude relationship between the total target value and a rated value, included in the rated values, of any one of the power converters included in the power converting units, and (ii) determine one of the power converters, to be used for charging and discharging, for each of the storage batteries.

The power control unit may further (i) obtain efficiency for each of the power converters when the converters are used, and, based on the obtained efficiency, (ii) determine one of the power converters to be used.

The information on a state of health for each of the storage batteries is indicated in state of health (SOH), and the second storage battery is higher in SOH than the first storage battery.

A power control apparatus according to an implementation of the present invention includes: a target value obtaining unit which obtains a total target value of power to be discharged from storage batteries; a state obtaining unit which obtains information on a state of health for each of the storage batteries; and a power control unit which determines, for each of the storage batteries, how the power of the total target value is divided among and discharged from each of the storage battery, wherein the power control unit (i) compares the state of health of a first storage battery and the state of health of a second storage battery, and, in the case where the state of health of the second storage battery is higher than the state of health of the first storage battery, (ii) discharges from the second storage battery second power lower than first power which is discharged from the first storage battery, the first storage battery and the second storage battery being included in the storage batteries.

A storage battery unit according to an implementation of the present invention includes: storage batteries; a target value obtaining unit which obtains a total target value of power to be stored in the storage batteries; a state obtaining unit which obtains information on a state of health for each of the storage batteries; and; and a power control unit which determines, for each of the storage batteries, how the power of the total target value is distributed and stored in each storage battery, wherein the power control unit (i) compares the state of health of a first storage battery and the state of health of a second storage battery, and, in the case where the state of health of the second storage battery is higher than the state of health of the first storage battery, (ii) charges the second storage battery with second power lower than first power with which the first storage battery is charged, the first storage battery and the second storage battery being included in the storage batteries.

A storage battery unit according to an implementation of the present invention includes: storage batteries; a target value obtaining unit which obtains a total target value of power to be discharged from the storage batteries; a state obtaining unit which obtains information on a state of health for each of the storage batteries; and a power control unit which determines, for each of the storage batteries, how the power of the total target value is divided and discharged from each storage battery, wherein the power control unit (i) compares the state of health of a first storage battery and the state of health of a second storage battery, and, in the case where the state of health of the second storage battery is higher than the state of health of the first storage battery, (ii) discharges from the second storage battery second power lower than first power which is discharged from the first storage battery, the first storage battery and the second storage battery being included in the storage batteries.

It is noted that such general and specific embodiments may be implemented in the form of, or in a combined form of, a system, a method, an integrated circuit, a computer program, and a storage medium.

Figure 4:
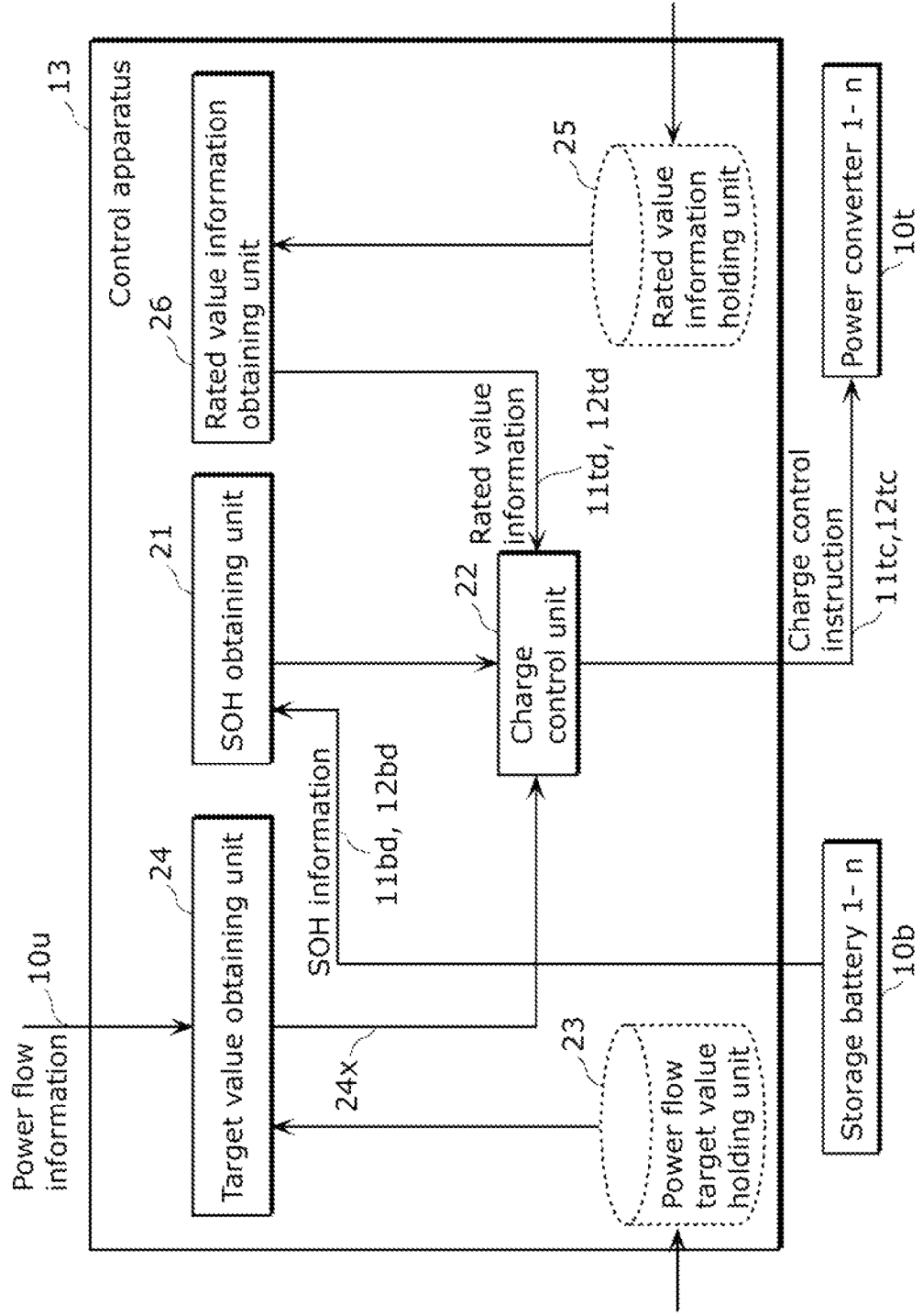
FIG. 4 depicts a functional block diagram of a control apparatus according to Embodiment 2.
Figure 7A:
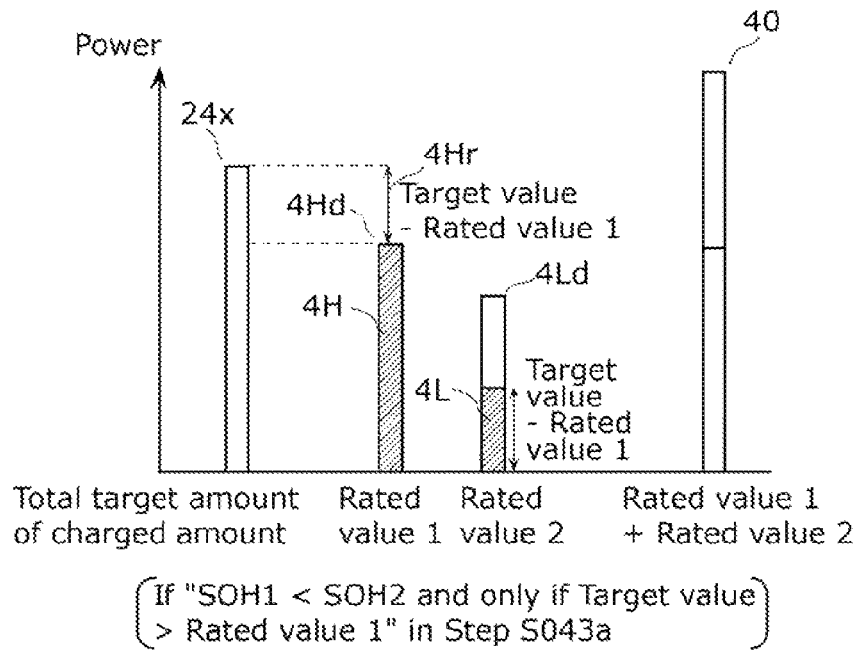
FIG. 7A depicts a conceptual diagram showing an outline of Embodiment 2.

A power control apparatus according to an implementation of the present invention determines power to be stored for each of storage batteries $11b$ and $12b$ to make up the power of the total target value (the power 24× of the total target value in the drawings such as FIGS. 4 and 7A), depending on the state of health (SOH: the information $11bL$ and $12bL$ in FIG. 1) for each of the storage batteries $11b$ and $12b$. In other words, the power control apparatus determines, depending on the SOH of each storage battery, which is to be prioritized—that is the life or the efficiency of the storage battery.

Such a feature successfully slows a decrease in the life of the entire storage battery system 10 and improves the efficiency of the storage battery system 10 in converting power.

For example, the feature makes shorter the life of one storage battery having a low SOH (for example, a first storage battery $11b$), and slows the decrease in the life of the other storage battery having a high SOH (for example, a second storage battery $12b$). Hence, the lives of the storage batteries $11b$ and $12b$ can end at a different time. Consequently, compared with the case where the lives of both the storage batteries end at the same time, the feature makes it possible to shorten the time period in which the entire storage battery system is down. Moreover, the feature eliminates the need for replacing both the batteries at the same time. This contributes to reducing the running cost for the storage battery system 10.

Furthermore, even though suffering low efficiency in power conversion when charging a storage battery having a high SOH (for example, the second storage battery $12b$), the storage battery system 10 can increase efficiency in converting the power for a storage battery having a low SOH (for example, the first storage battery $11b$). This is because the storage battery system 10 uses, for example, relatively high power close to the rated value to perform the power conversion for charging the storage battery having the low SOH. Consequently, compared with a conventional technique, such a feature contributes to improving the efficiency of the entire storage battery system 10 in converting power.

Figure 5:
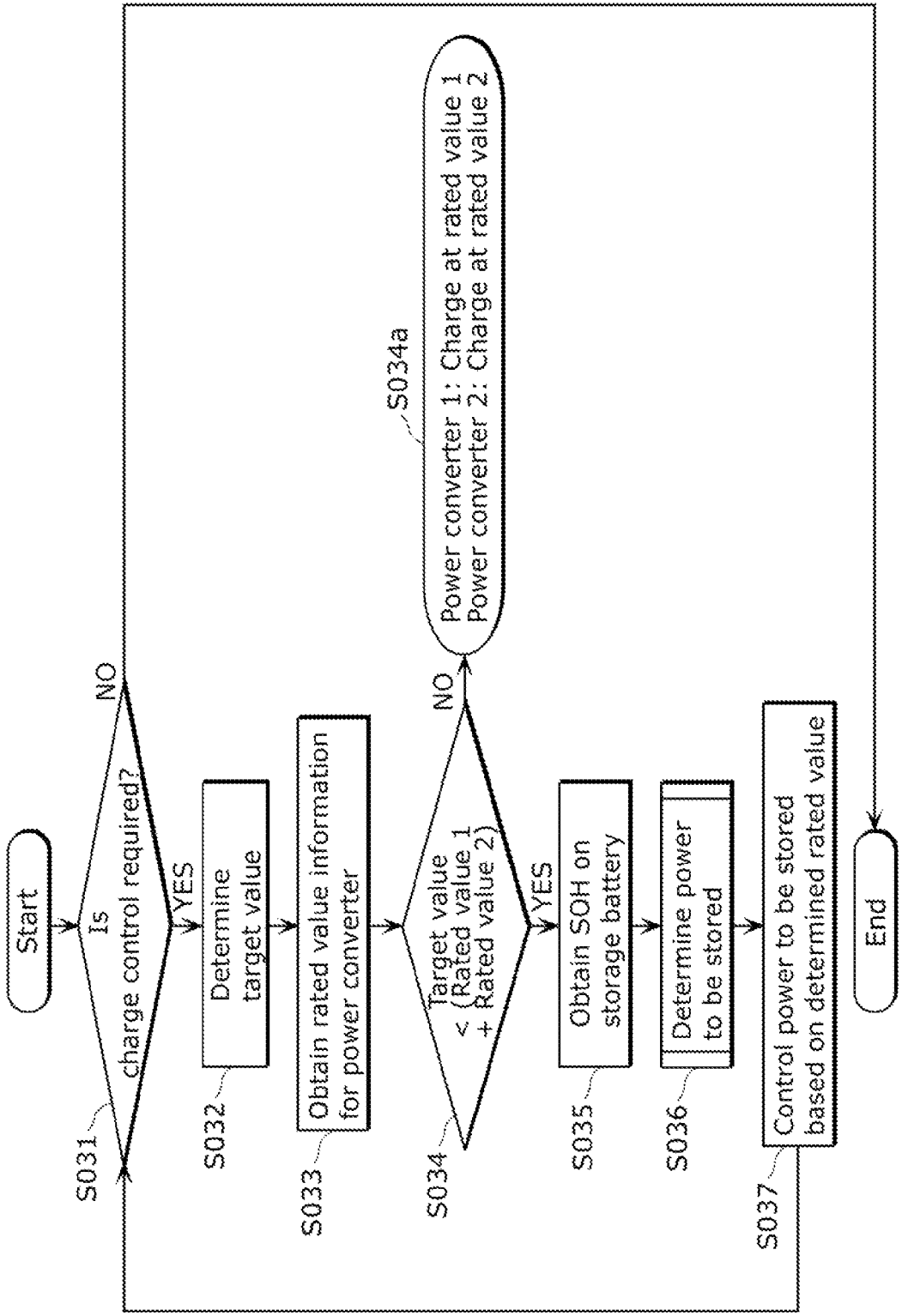
FIG. 5 depicts a flowchart exemplifying an operation of the control apparatus according to Embodiment 2.

In addition, in the case where the total value (power 40 in the drawings such as FIG. 7A) of the rated values of each of the power converters $11t$ and $12t$ is greater than the total target value (the power 24× of the total target value in the drawings such as FIGS. 4 and 7A) of the charged amount (S034 In FIG. 5: NO), a storage battery to be charged with power at its rated value is charged with such power. Hence, the charge through power conversion by any given power converter is performed with the power of the rated value of the given power converter, which allows each of the power converters to operate with high efficiency. Consequently, such a feature successfully reduces power loss which occurs in each of the power converters.

Here, the life of a typical storage battery is said to be shorter as the storage battery is charged with higher power. Using a technique of an implementation of the present invention, a storage battery having a high SOH is charged with lower power. Hence, when the SOH of a storage battery is high, the battery is charged with lower power, which contributes to slowing a decrease in the life of the storage battery.

In other words, a storage battery having a low SOH is charged with higher power. Thus, the life of the storage battery is expected to be shorter. However, the life of a storage battery having a low SOH is expected to be relatively shorter than that of a storage battery having a high SOH. Hence, the life of the entire storage battery system can be extended by slowing a decrease in the life of a storage battery having a high SOH than charging a storage battery having a low SOH with lower power to slow a decrease in the life of the low storage battery.

Described hereinafter are the embodiments of the present invention, with reference to the drawings. It is noted that operations of storage battery systems in charging are detailed first in Embodiments 1 to 3. An Operation of the storage battery systems in discharging is described in Embodiment 4.

<Embodiment 1>

FIG. 1 depicts a system structure diagram of a power supply system 10h according to Embodiment 1. The power supply system 10h includes the storage battery system 10, a load 10j, a distribution board 10i, a utility grid 10k, and a photovoltaic power generation (PV) 10p. The storage battery system 10 is installed in, for example, a building such as an ordinary house, an office building, or a factory.

The storage battery system 10 is charged with, for example, power $P_{SB}$ such as the following (i) to (iii):(i) power generated by a generator of a power station and supplied through the utility grid 10k; (ii) power generated by the PV 10p; and (iii) surplus power generated by subtracting power $P_L$ which the load 10j consumes from power flow Ps provided through the distribution board 10i. It is noted that the power to be stored shall not be limited to the one in (i) to (iii). Any other power may be used for the charge as far as the storage battery system 10 can be charged with the power.

The storage battery system 10 includes a control apparatus 13, the first storage battery 11b, the first power converter 11t, the second storage battery 12b, and the second power converter 12t.

The first and second storage batteries 11b and 12b store power.

Each of the first and second power converters 11t and 12t converts power to be supplied thereto so that the converted power can be stored in the first and second storage batteries 11b and 12b. The first and second power converters 11t and 12t may be, for example, a DC/DC converter, an AC/DC converter, a DC/AC converter, or a bi-directional inverter.

The conversion efficiency of the first power converter 11t in converting power is higher as the stored power is closer to the rated value of the first power converter 11t. The conversion efficiency of the second power converter 12t in converting power is higher as the stored power is closer to the rated value of the second power converter 12t. In contrast, the conversion efficiency of the first power converter 11t is lower as the stored power is lower than the rated value of the first power converter 11t. The conversion efficiency of the second power converter is lower as the stored power is lower than the rated value of the second power converter 12t.

The control apparatus 13 executes control based on power flow information 10u. The control of the control apparatus 13 involves controlling the power to be stored in the first and the second storage batteries.

Specifically, based on the power flow information 10u, the control apparatus 13 controls the power to be stored in each of the batteries by respectively transmitting an instruction value 11tc and an instruction value 12tc to the first power converter 11t and the second power converter 12t to control the first power converter 11t and the second power converter 12t.

The power flow information 10u is obtained, for example, from a server provided outside or from a predetermined control apparatus for controlling the entire storage battery system 10h.

It is noted that exemplified hereinafter is the case where the storage battery system 10 includes two storage batteries and two power converters; however, the number of the storage batteries and the power converters shall not be limited to two. Any given number of the storage batteries and power converters may be provided. Each of the embodiments can be implemented with any additional number of the storage batteries.

Figure 2:
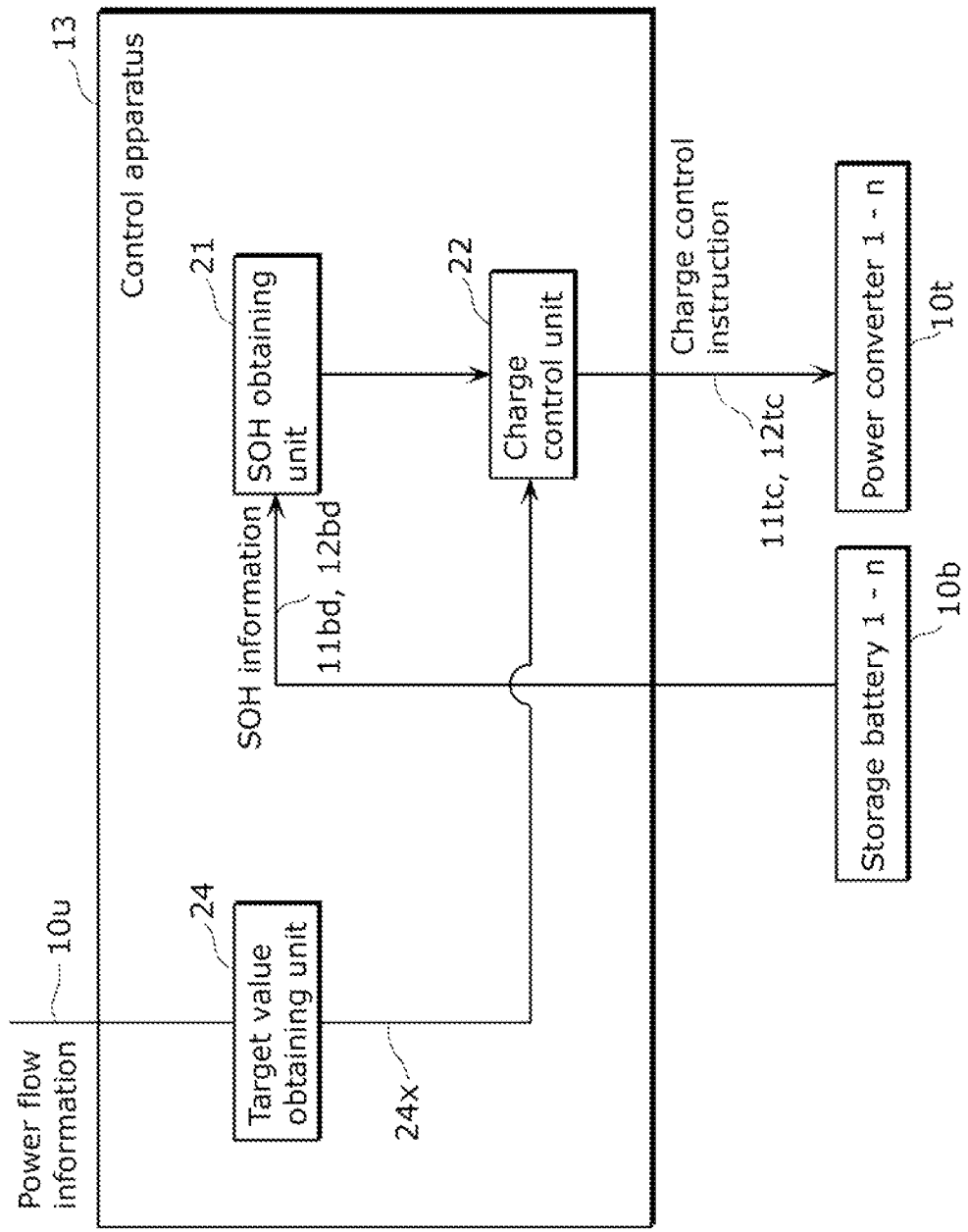
FIG. 2 depicts a functional block diagram of a control apparatus according to Embodiment 1.

FIG. 2 depicts a functional block diagram of the control apparatus 13 according to Embodiment 1. In FIG. 2, the control apparatus 13 includes an SOH obtaining unit 21, a charge control unit 22, and a target value obtaining unit 24.

It is noted that the control apparatus 13 may further include a functional block other than the SOH obtaining unit 21, the charge control unit 22, and the target value obtaining unit 24. As described later in FIG. 4, for example, the control apparatus 13 may further include a rated value information obtaining unit 26.

It is noted that the control apparatus 13 may be a computer including, such as, a central processing unit (CPU), a read-only memory (ROM), and a random access memory (RAM). The function of each of the functional blocks, such as the SOH obtaining unit 21, is implemented, for example, when the computer executes software thereon.

The control apparatus 13 may include an integrated circuit (not shown) including circuits each provided for implementing a corresponding function.

The SOH obtaining unit 21 obtains SOH information indicating a SOH for each of two storage batteries; namely, the first and second storage batteries 11b and 12b. The SOH is generally defined in this technical field as an indicator to show the state of health or the state of deterioration of a storage battery.

The life of a storage battery is shorter as the SOH value of the storage battery is smaller. In other words, the SOH of a storage battery shows the rate of the amount of power to be stored full charge in the storage battery to the rating capacity of the storage battery when the storage battery is new. For example, when the rating capacity of a storage battery is 5 kWh, the full charge amount of the storage battery at some point is 4 kWh. Here, the SOH of the storage battery at this point is calculated as follows: SOH=4/5× 100=80%.

It is noted that the SOH information may be obtained from each storage battery 10b (1 to n. For example, n=2 as shown in FIG. 1). Here, each storage battery is capable of calculating the SOH. Furthermore, the SOH obtaining unit 21 may be capable of calculating the SOH for each storage battery 10b.

It is noted that any given SOH calculating technique may be applicable as far as the technique is widely known in the technical field.

The charge control unit 22 determines the power to be stored in each of the storage batteries, based on the SOH information obtained by the SOH obtaining unit 21 for each of the storage batteries. Specifically, the charge control unit 22 compares the SOHs of the two storage batteries, and charges the storage battery in a higher SOH with power lower than that for the other storage battery in a lower SOH is charged. In other words, the charge control unit 22 charges a storage battery having a high SOH (a battery not deteriorated) with power lower than that for another storage battery in a lower SOH (a deteriorated battery).

The target value obtaining unit 24 determines the power 24x of the total target value (See the drawings such as FIGS. 7A and 7B) to be stored in each of the storage batteries. In other words, the power 24x of the total target value is the target power to be stored in the storage battery system 10.

It is noted that, for example, the target value obtaining unit 24 obtains the power flow information 10u (FIG. 4)

indicating the power flow between the utility grid 10*k* (FIG. 1) and the storage battery system 10. Then, based on the obtained power flow information 10*u*, the target value obtaining unit 24 determines the power 24× of the total target value.

In other words, for example, the control apparatus 13 may obtain the target value of a power flow from a predetermined control apparatus installed in a building and the like.

Then, the power 24× of the total target value may be determined so that the power flow to be specified by the obtained power flow information 10*u* comes closer to the obtained target value of the power flow.

It is noted that the control apparatus 13 may further include a power flow target value holding unit 23 (See FIG. 4) which holds the obtained target value of the power flow. Then, based on the target value of the power flow held in the power flow target value holding unit 23, the control apparatus may determine the power 24× of the total target value to be stored in each of the above-described storage batteries.

For example, the charge control unit 22 may charge a storage battery having a lower SOH with power, which is equal to or lower than the power 24× of the total target value, determined as relatively high first power 4H (See a drawing such as FIG. 7A). Then, for example, the charge control unit 22 may charge a storage battery having a higher SOH with relatively low second power 4L which is power generated by subtracting the first power 4H from the power 24× of the total target value (=the target value−the first power 4H).

Such features make it possible to achieve each of the above-described effects, as well as to bring the total power—that is the sum of power to be stored in each of the storage batteries—to the determined power 24× of the total target value.

Figure 3:
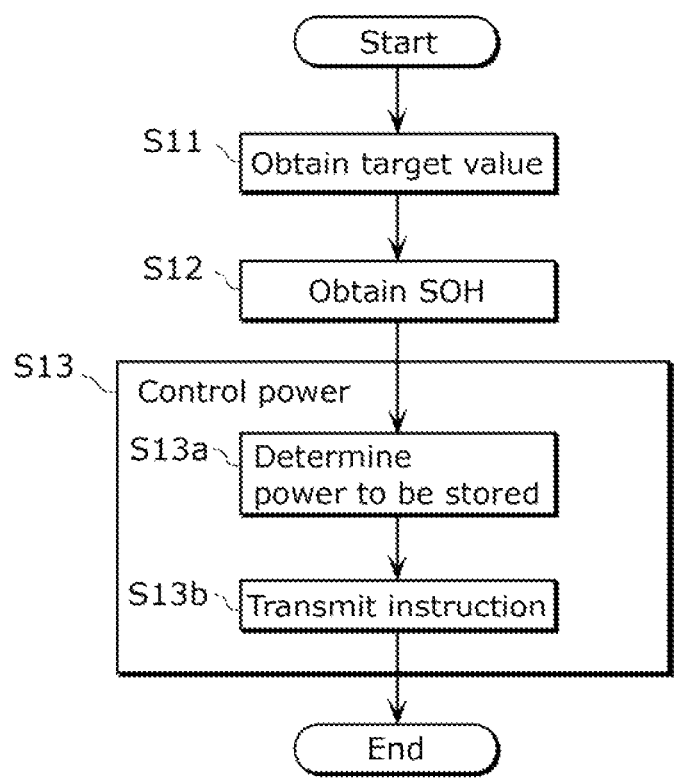
FIG. 3 depicts a flowchart exemplifying an operation of the control apparatus according to Embodiment 1.

FIG. 3 depicts a flowchart showing an operation of the control apparatus 13 according to Embodiment 1. It is noted that, in Embodiment 1, exemplified is the case where the SOH of the first storage battery 11*b* is lower than the SOH of the second storage battery 12*b*; that is, the case where the first storage battery 11*b* is lower in SOH than the second storage battery 12*b*. Here, the charge control unit 22 charges the storage battery 11*a* having the lower SOH than that of the storage battery 12*b* with power higher than that to be stored in the storage battery 12*b*.

First, based on the power flow information 10*u* as described above, the target value obtaining unit 24 obtains a target value which is the total power to be stored in each of the storage batteries (S11). Furthermore, the SOH obtaining unit 21 obtains the SOH information from each of the storage batteries 10*b* among n-number of storage batteries. The order of S11 and S12 may be switched. S11 and S12 may simultaneously be carried out.

Then, the charge control unit 22 compares the SOHs of the storage batteries 10*b* with each other to determine how much power to be stored in each of the storage batteries 10*b*.

Specifically, in S13, the charge control unit 22 compares the SOHs of the storage batteries 10*b* with each other. Then, based on the target value, the charge control unit 22 determines the power to be stored in the storage batteries 10*b* in a manner that a storage battery having a higher SOH is charged with lower power (S13*a*). Comparing the two batteries; namely the storage batteries 11*b* and 12*b*, the storage battery 12*b* has a higher SOH. Hence, the charge control unit 22 determines the power to be stored in each of the storage batteries 11*b* and 12*b* in a manner that the storage battery 12*b* is charged with lower power than the storage battery 11*b*.

Next, the charge control unit 22 transmits, to each of the power converters 10*t*, control instructions 11*tc* and 12*tc* for charging the storage batteries 10*b* with power to be stored for each of the storage batteries 10*b* (S13*b*).

Hence, a storage battery having a high SOH (for example, the second storage battery 12*b*) is charged with relatively low power. This makes it possible to slow deterioration of the storage battery having the high SOH when the battery is charged. Consequently, such a feature successfully slows a decrease in the life of the storage battery having the high SOH.

As a result, the feature can prevent the case where the lives of all the storage batteries end at approximately the same time, and thus, the entire storage battery system 10 is down.

In contrast, a storage battery having a lower SOH (the first storage battery 11*b*) is charged with relatively high first power. Thus, the power converter 10*t* used for the charge (the first power converter 11*t*) can convert the power with high efficiency.

This prevents the lives of the two storage batteries from lasting for the same period and ending at the same time (at close times to each other).

Consequently, the feature successfully prevents the case where the two batteries run down at the same time (at close times to each other), followed by causing an extra cost to replace the entire storage battery system.

<Embodiment 2>

In Embodiment 1, the power to be stored in each of the storage batteries is determined based on SOH information on each storage battery. In Embodiment 2, the power to be stored in each of the storage batteries is determined based on the rated value of each of power converters, in addition to the SOH information on each storage battery (in other words, the SOH of each storage battery).

FIG. 4 depicts a functional block diagram of the control apparatus 13 according to Embodiment 2.

In FIG. 4, the control apparatus 13 further includes a rated value information obtaining unit 26 in addition to the functional blocks in FIG. 2.

The rated value information obtaining unit 26 (FIG. 4) may specify a rated value of each of power converters (the first and second power converters 11*t* and 12*t*).

Here, for example, the specified rated value is the maximum value of power to be stored in a storage battery (the first storage battery 11*b*) which corresponds to a power converter (for example the first power converter 11*t*) that converts the power with the rated value.

It is noted that the control apparatus 13 may further include a rated value information holding unit 25 which holds a piece of rated value information for each of the power converters. Then, from the rated value information holding unit 25, the rated value information obtaining unit 26 may obtain a piece of the rated value information corresponding to one of the power converters.

It is noted that each of the held pieces of the rated value information may be one obtained from the outside of the control apparatus 13, such as a predetermined control apparatus in a building. Here, the predetermined control apparatus may be the same as an apparatus which transmits, to the control apparatus 13, the above-described target value of a power flow.

Then, the charge control unit 22 may send each of the power converters an instruction to obtain power lower than or equal to a specified rated value. Moreover, for example, the charge control unit 22 may send each of the power converters an instruction to obtain power lower than or equal to either power at the target value to be stored in the storage battery system or power at a rated value of each power converter, whichever is the lower.

Such a feature can avoid sending a power converter an instruction to obtain power higher than the rated value of the power converter.

Described hereinafter is an operation of the above-structured control apparatus 13.

FIG. 5 depicts a flowchart showing an operation of the control apparatus 13 according to Embodiment 2. In the processing of the flowchart in FIG. 5, the charge control unit 22 determines how much power to be stored in each of the storage batteries, based on the SOH information for each storage battery and the rated value of each power converter.

When charge control is required (S031: Yes), the charge control unit 22 first determines the power 24× of the total target value (See a drawing such as FIG. 7) representing the sum of power of each of the storage batteries based on power flow information 10 (S032).

Then, the charge control unit 22 specifies pieces of rated value information 11td and 12td for corresponding power converters (S033). It is noted that, for example, in S033, each piece of the rated value information may be obtained by the rated value information obtaining unit 26.

The charge control unit 22 determines whether or not the power 24× of the total target value determined in S032 is lower than or equal to the total value (See a drawing such as FIG. 7A) of the specified rated values for the power converters (S034).

In S034, when the power 24× of the total target value is lower than the total value of the rated values of the power converters (S034: No), the charge control unit 22 charges each of the storage batteries (the first and second storage batteries 11b and 12b) at the rated value of one of the power converters corresponding to the storage battery (S034a).

Thus, in the case where the determined power 24× of the total target value is lower than the total value of the rated values of the power converters, each of the batteries is charged at the rated value of one of the power converters corresponding to the battery. Hence, the batteries are charged with high conversion efficiency.

In contrast in S034, in the case where the power 24× of the total target value is lower than the total value of the rated values of the power converters (S034: Yes), the SOH obtaining unit 21 obtains the SOH information on each of the storage batteries (See the above-described S12).

Next, the charge control unit 22 determines power to be stored in each of the storage batteries based on the obtained SOH information and the rated value information (S036). The details of S036 will be described later in FIG. 6.

Then, the charge control unit 22 controls the power to be stored in each of the storage batteries by transmitting an instruction value to each of the power converters to charge one of the storage batteries corresponding to the power converter with the determined power (S037).

Figure 6:
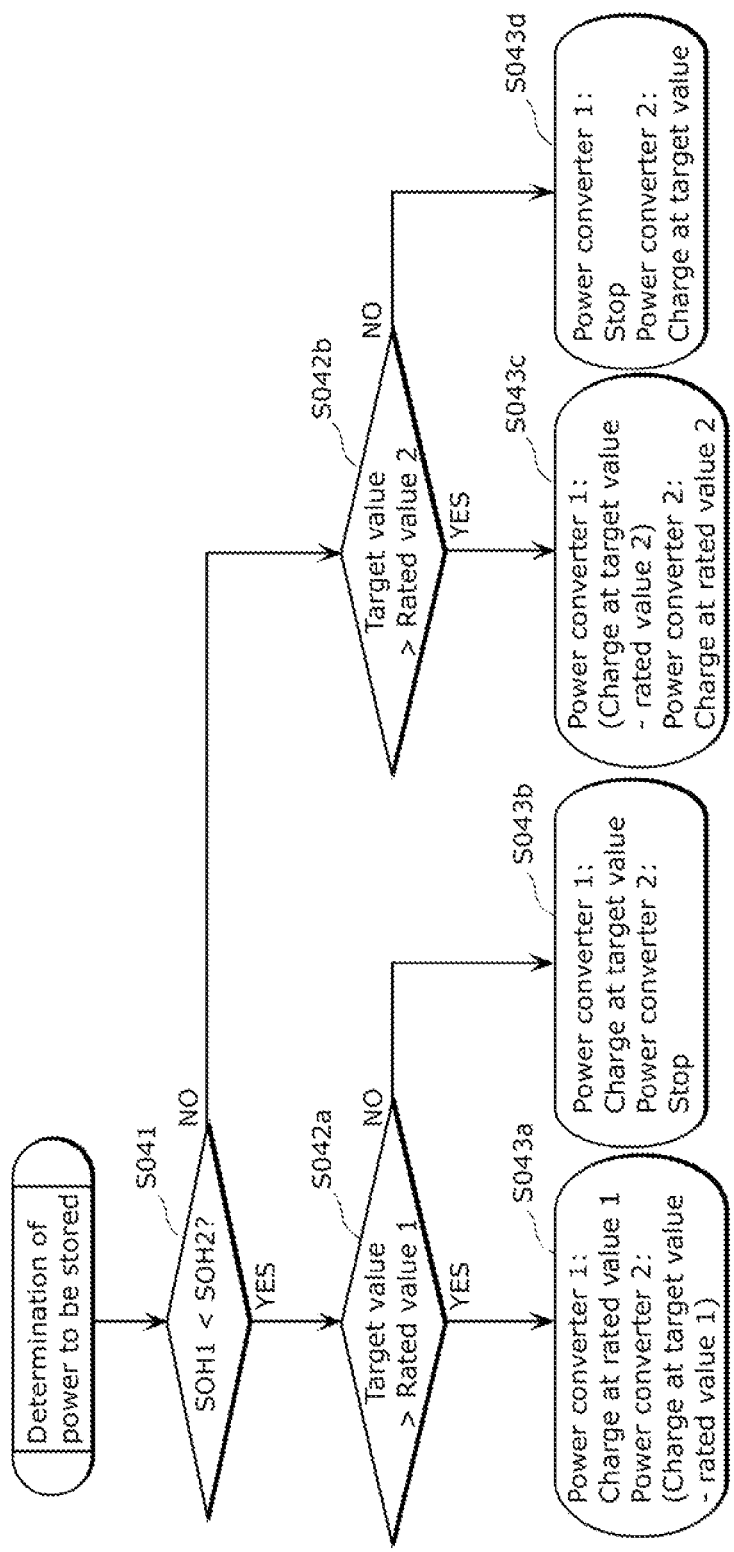
FIG. 6 depicts a flowchart exemplifying an operation of the control apparatus in determining power to be stored according to Embodiment 2.

FIG. 6 depicts a flowchart showing how the control apparatus 13 according to Embodiment 2 determines the power to be stored. FIGS. 7A to 7D depict conceptual diagrams showing an outline of Embodiment 2. Each of FIGS. 7A to 7D is a graph of power. Described hereinafter is how the control apparatus 13 according to Embodiment 2 determines the power to be stored, with reference to FIGS. 6 to 7D.

It is noted that each of the graphs in FIGS. 7A to 7D shows the relatively high first power 4H and the relatively low second power 4L. The first power 4H is higher than the second power 4L.

Figure 7B:
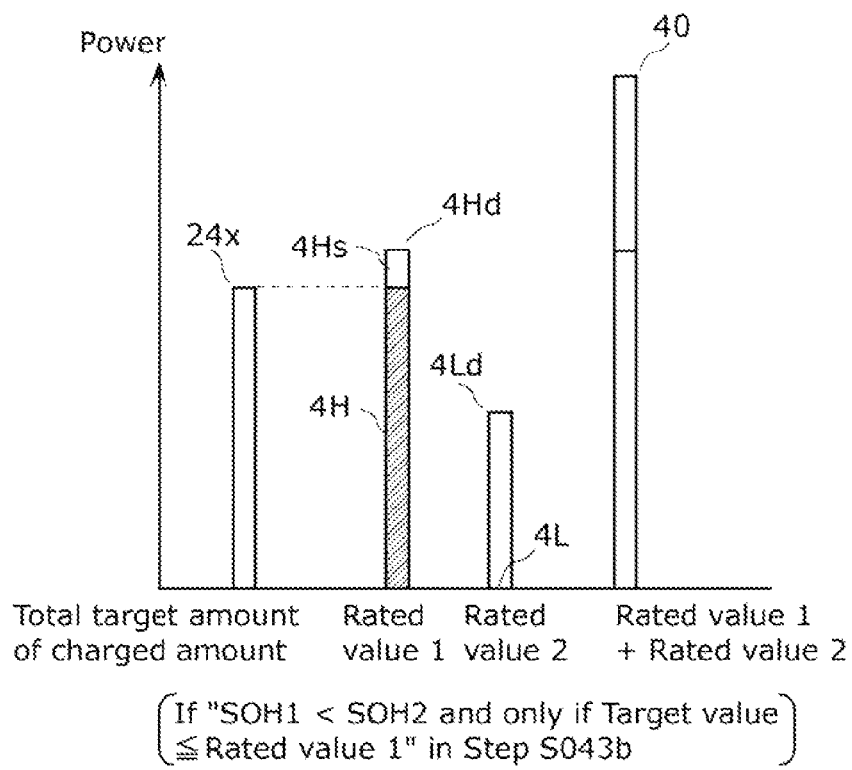
FIG. 7B depicts a conceptual diagram showing an outline of Embodiment 2.
Figure 7C:
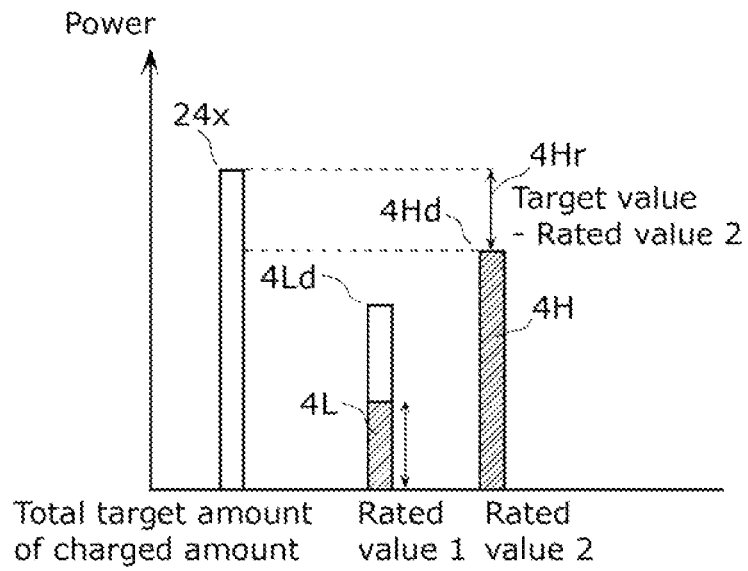
FIG. 7C depicts a conceptual diagram showing an outline of Embodiment 2.
Figure 7D:
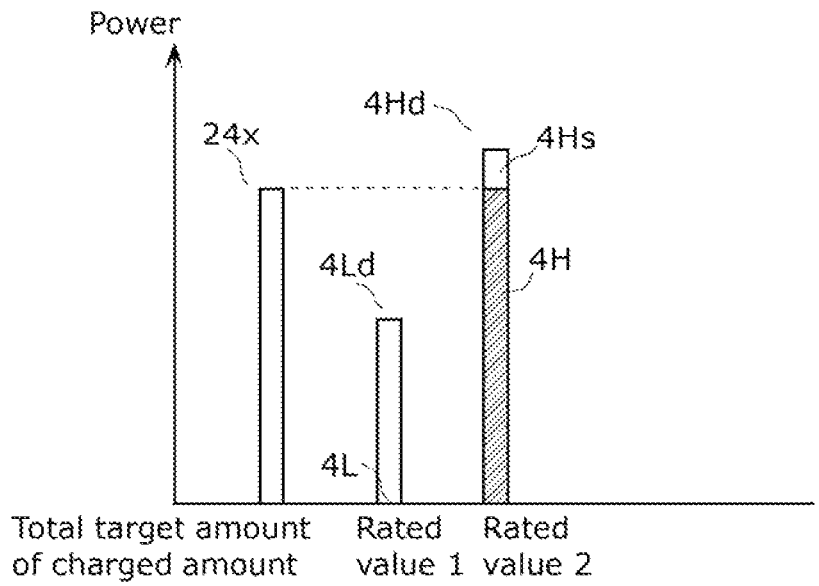
FIG. 7D depicts a conceptual diagram showing an outline of Embodiment 2.

It is noted that the second power 4L is zero in each of the graphs in FIGS. 7B and 7D. For the sake of convenience, the second power 4L is schematically illustrated in FIGS. 7B and 7D.

The first power described in Embodiment 1 is, for example, the first power 4H shown in FIG. 7A to 7D. The second power described in Embodiment 1 is, for example, the second power 4L shown in FIG. 7A to 7D.

Described hereinafter is each of operations of the control apparatus 13 in FIG. 13 in determining power to be stored.

In S036 in FIG. 5, the processing to be executed is, for example, the one in the flowchart shown in FIG. 6.

In S041, the charge control unit 22 specifies each of a storage battery having a low SOH and a storage battery having a high SOH (See S13a).

In S042a, S042b, S043a to S043d, and S037, as described above, the charge control unit 22 charges the specified storage battery having the low SOH (the first storage battery 11b, for example) with the relatively high first power 4H.

Then, in S042a, S042b, S043a to S043d, and S037, the charge control unit 22 charges the specified storage battery having the high SOH (the second storage battery 12b, for example) with the relatively low second power 4H (See S13b).

The details in FIGS. 5 and 6 shall be described below.

Specifically, in each of S042a and S042b, the charge control unit 22 determines whether or not the power 24× of the total target value (See FIGS. 78 and 7D) is higher than the rated value 4Hd of the power converter in the lower SOH.

Here, the rated value 4Hd is the maximum value of the power to be stored in the storage battery in the lower SOH, and of the high first power 4H.

In each of S043b and S043d, in the case where the determination result shows that the power 24× of the total target value is not as high as the rated value 4Hd, (FIGS. 78 and 7D S042a: NO, S042b: NO), the charge control unit 22 determines the power 24× of the total target value as the high first power 4H and 0 as the low second power 4L (FIGS. 7B and 7D).

In contrast, in each of S043a and S043c, in the case where the determination result shows that the power 24× of the total target value (See FIGS. 7A and 7C) is higher than or equal to the rated value 4Hd (FIGS. 7A and 7C S042a: YES, S042b: YES), the charge control unit 22 determines, as the high second power 4H, the rated value 4Hd of the power converter for use in storing the second power 4H. Here, the charge control unit 22 determines, as the low first power 4L, power 4Hr generated by subtracting the rated value 4Hd— that is the determined second power 4H—from the power 24× of the total target value (FIGS. 7A and 7C).

[Modification]

Embodiment 2 has exemplified the case of two storage batteries; however, the number of the storage batteries shall not be defined as two. Instead, any given number of storage batteries may be used. Described hereinafter is the case where there are n-number of storage batteries (n≤2).

Figure 8:
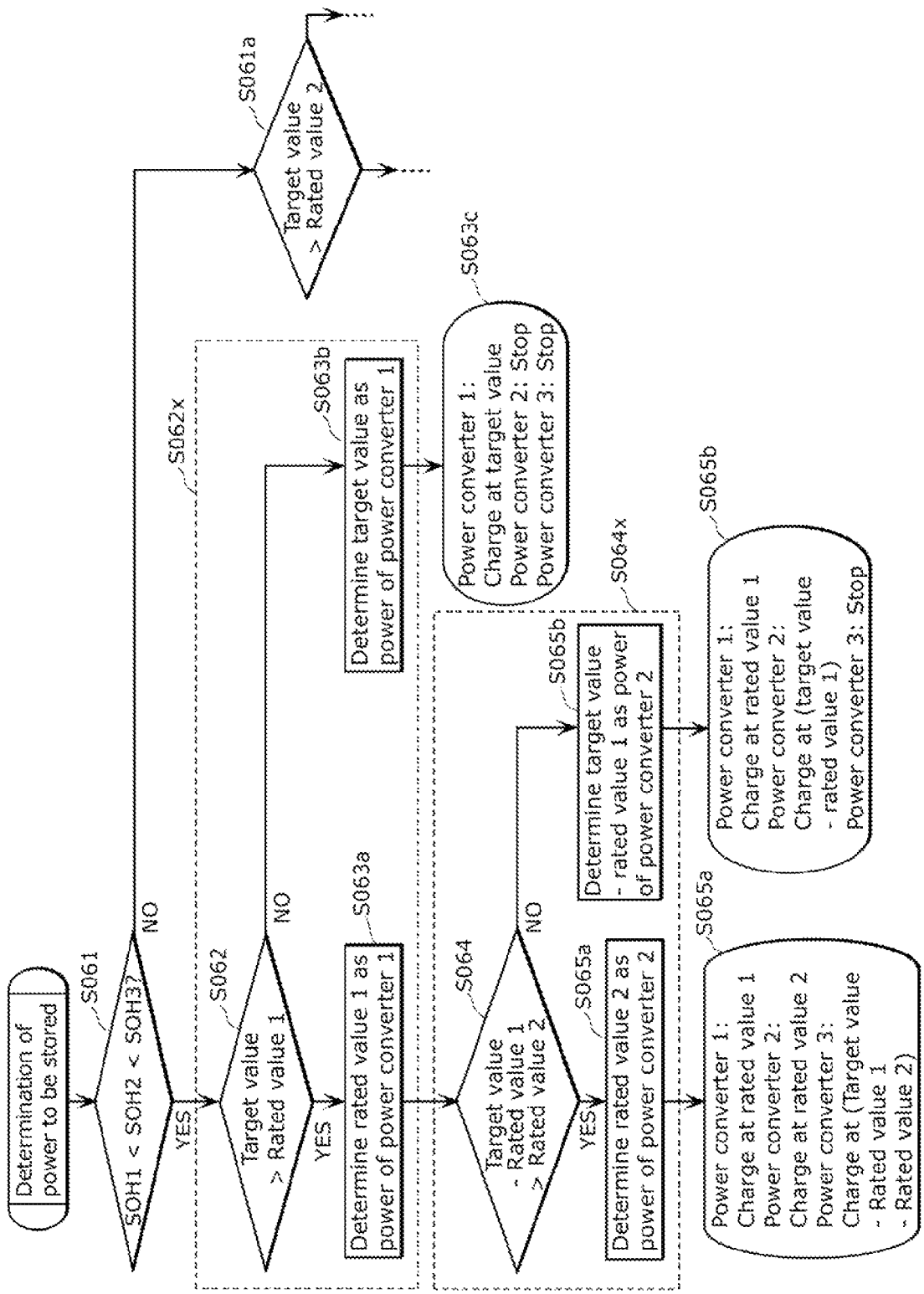
FIG. 8 depicts a flowchart exemplifying an operation of the control apparatus in determining power to be stored according to Modification in Embodiment 2.

FIG. 8 depicts a flowchart exemplifying how the control apparatus 13 according to Modification in Embodiment 2 determines power to be stored. The flowchart in FIG. 8 exemplifies the case where there are three storage batteries. Described hereinafter is the case where the number of the storage batteries is generalized as n-number.

First, the charge control unit 22 compares the SOHs of the storage batteries with each other to determine the order of the degrees of the SOHs of the storage batteries. In other words, the charge control unit 22 determines the order of the SOHs of the storage batteries (S061).

It is noted that the step—that is S061: YES in FIG. 8—shows an exemplary case where the charge control unit 22 determines the SOH (SOH 1) of the first storage battery as the first SOH in the order, the SOH(SOH 2) of the second storage battery as the second SOH in the order, and the SOH(SOH 3) of the third storage battery as the third SOH in the order.

Next, the charge control unit 22 executes the succeeding first processing, the second processing . . . , and the (n−1)th processing.

In other words, in the example in FIG. 8, the charge control unit 22 executes the first processing (S062x) and the second processing (S064x) since n=3 holds.

Then, in the k-th processing (k=1, 2, . . . , n−1), the charge control unit 22 determines the power to be stored in the k-th storage battery in the order.

In other words, in the k-th processing, the charge control unit 22 executes processing based on the target value X(k) of the power—that is the sum of power to be stored in the k-th to the n-th storage batteries in the order.

Here, X(1) is the power of the above-described target value (See the power 24x of the total target value shown in the drawings such as FIG. 7A) determined in S032 in FIG. 5.

X(k+1) is the power generated by subtracting from X(k) the determined power stored in the k-th storage battery in the order.

Then, in the first step (S062 and S064) in the k-th processing, the charge control unit 22 first determines whether or not the target value X(k) is higher than the rated value of the power converter corresponding to the k-th storage battery in the order.

Then, in the case where the determination result shows in the second step (S063b and S065b) in the k-th processing that the target value X(k) is not higher than the rated value (S062: NO and S064:NO), the charge control unit 22 determines that the power to be stored in the k-th storage battery is the target value X(k).

It is noted that, in the second step (S063b and S065b), the charge control unit 22 determines, as 0, power to be stored in each of the storage batteries in the order after the k+1-th storage battery.

In contrast, in the case where the determination result shows in the third step (S063a and S065a) in the k-th processing that the target value X(k) is higher than the rated value (S062: YES and S064: YES), the charge control unit 22 determines that the power to be stored in the k-th storage battery in the order is the power of the rated value of the storage battery.

It is noted that in the case where k=n−1 holds (in the case of S064x), the charge control unit 22 determines in the third step (S065a) that the power to be stored in the k+1−(=n) th storage battery in the order is generated by subtracting, from the target value X(k), the power of the rated value of the power converter corresponding to the k-th storage battery in the order.

In other words, in the illustrated S065a, the charge control unit 22 determines that the power to be stored in the n-th (=3) storage battery in the order is obtained as the following expression: Target value−Rated value 1−Rated value 2.

It is noted that, in the case where S061: NO, the same processing as the one in S061:YES may be executed.

<Embodiment 3>

Figure 9:
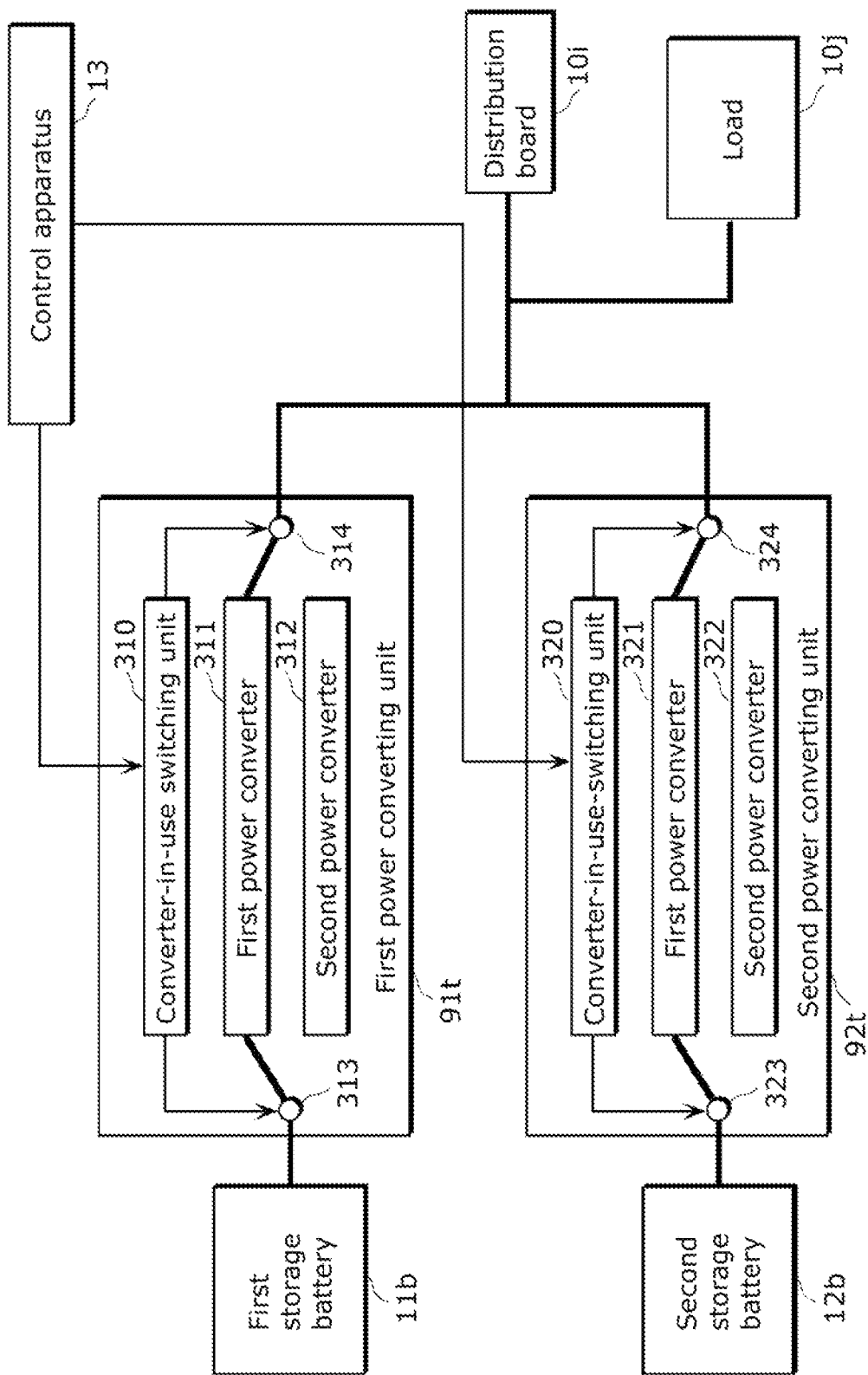
FIG. 9 depicts a system structure of a power supply system according to Embodiment 3.

FIG. 9 depicts a system structure of the power supply system 10h according to Embodiment 3.

The first power converting unit 91t includes a converter-in-use switching unit 310, a first power converter 311, and a second power converter 312.

The first power converter 311 has a rated value of 4Hda (FIGS. 12A to 12D).

The second power converter 312 has a rated value of 4Hdb which is lower than the rated value Hda for the first power converter 311.

Upon receiving a direction to use one of the first power converter 311 and the second power converter 312, the converter-in-use switching unit 310 causes the power converter, which is selected with the direction, to charge a storage battery.

It is noted that the first power converting unit 11t includes switches 313 and 314 to select, for example, one of the first power converter 311 and the second power converter 312.

Then, the converter-in-use switching unit 310 may operate each of the switches 313 and 314 to make an electrical connection to the first power converter 311 and cause the first power converter 311 to charge the storage battery.

Then, the converter-in-use switching unit 310 may operate each of the switches 313 and 314 to make an electrical connection to the second power converter 312 and cause the second power converter 312 to charge the storage battery.

The second power converting unit 92t includes a converter-in-use switching unit 320, a first power converter 321, and a second power converter 322.

The operations of the converter-in-use switching unit 320 and the like are similar to those of, for example, the converter-in-use switching unit 310 and the like in the first power converting unit 91t. Hence, the details thereof shall be omitted.

Figure 10:
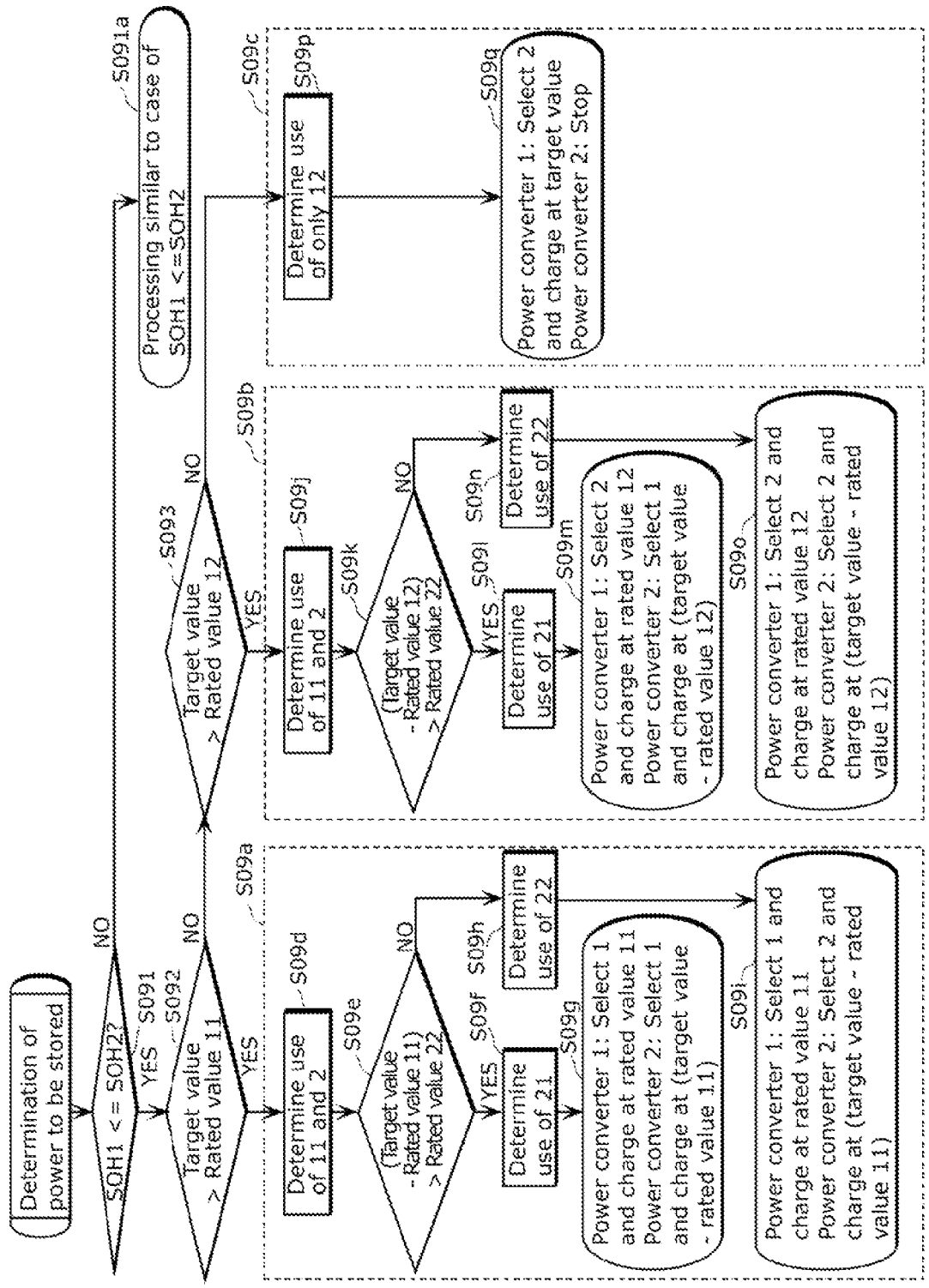
FIG. 10 depicts a flowchart exemplifying an operation of the control apparatus in determining power to be stored according to Embodiment 3.

FIG. 10 depicts a flowchart showing how the control apparatus 13 according to Embodiment 3 determines the power to be stored.

It is noted that S09g in FIG. 10 shows a statement which reads, "Power converter 1: Select 1 . . . " The statement shows that the first power converter 311 is selected in the first power converting unit 91t. Statements other than the one in S09g show a context similar to that of the statement in S09g.

Then, as exemplary processing in S036 in FIG. 5, the processing shown in the flowchart in FIG. 10 may be executed.

In S091, each of a storage battery having a relatively low SOH and a storage battery having a relatively high SOH is specified.

In S092 and S093, processing determined based on the power 24x of the total target value (See FIGS. 12A to 12E and S032 in FIG. 5) is executed.

Figure 12A:
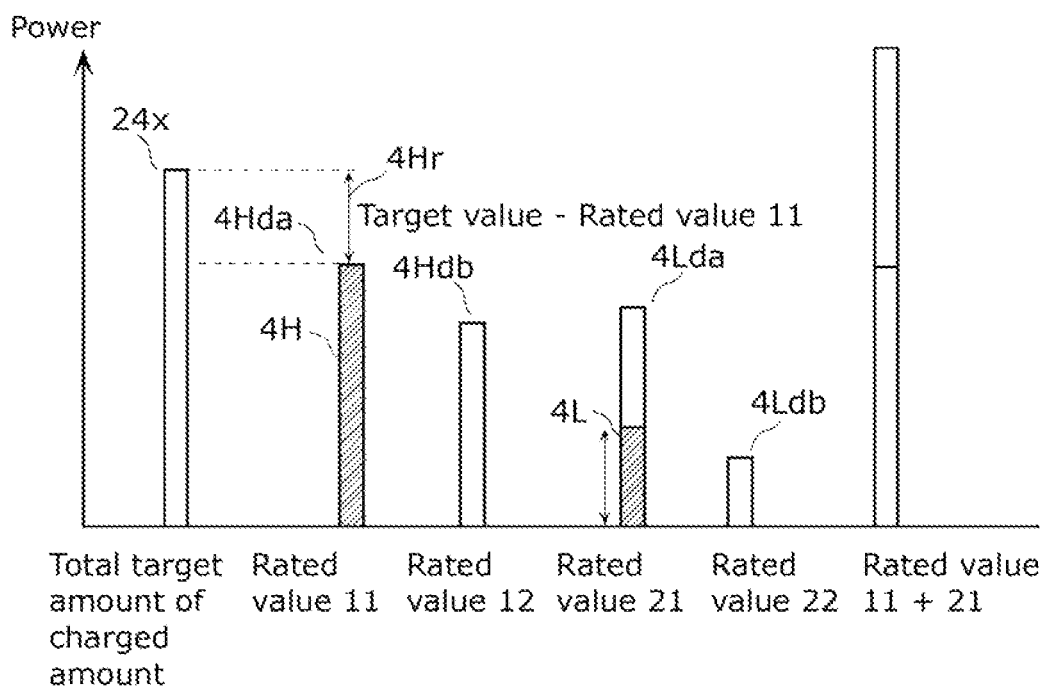
FIG. 12A depicts a conceptual diagram showing an outline of Embodiment 3.
Figure 12B:
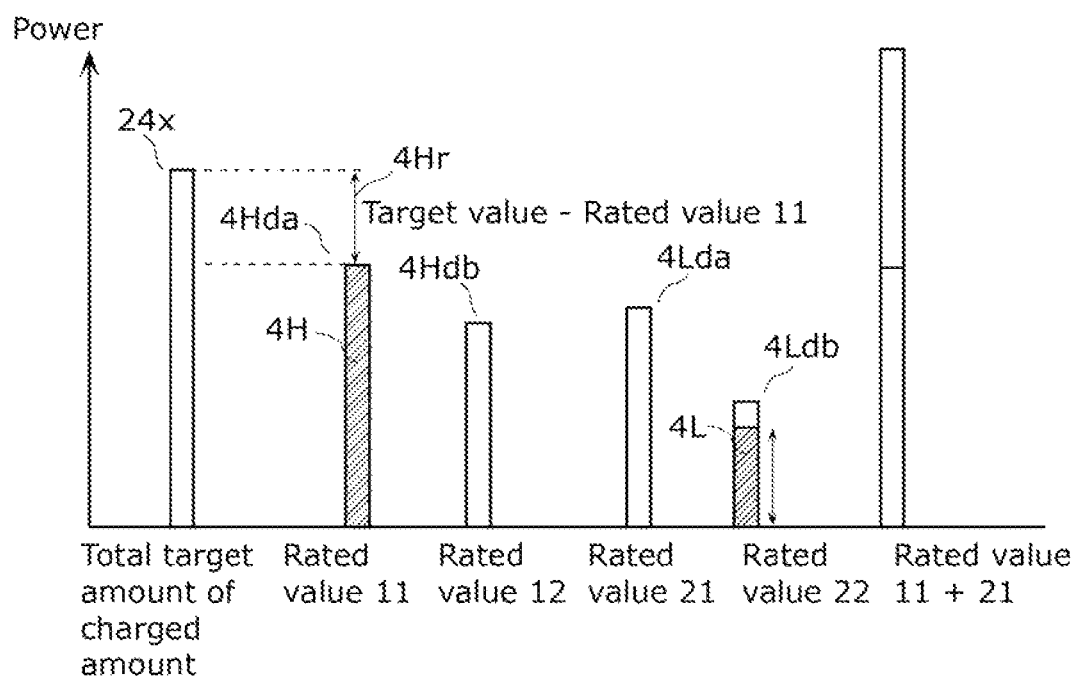
FIG. 12B depicts a conceptual diagram showing an outline of Embodiment 3.

Here, the first case is the one where the power 24x of the total target value is higher than the rated value 4Hda of the first power converter 311 (FIGS. 12A and 12b, and S092: YES).

Figure 12C:
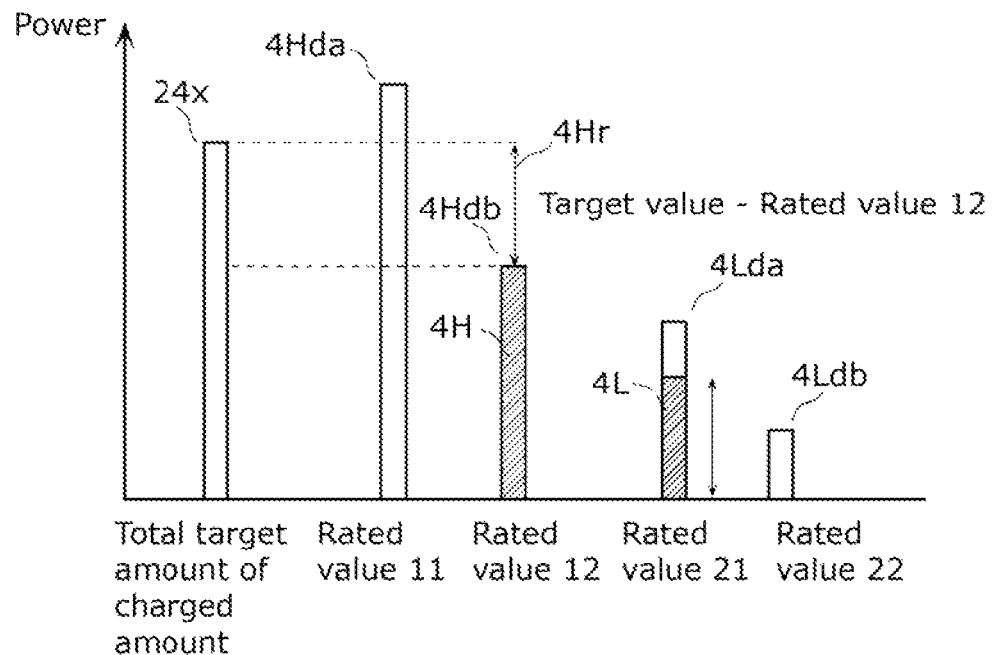
FIG. 12C depicts a conceptual diagram showing an outline of Embodiment 3.
Figure 12D:
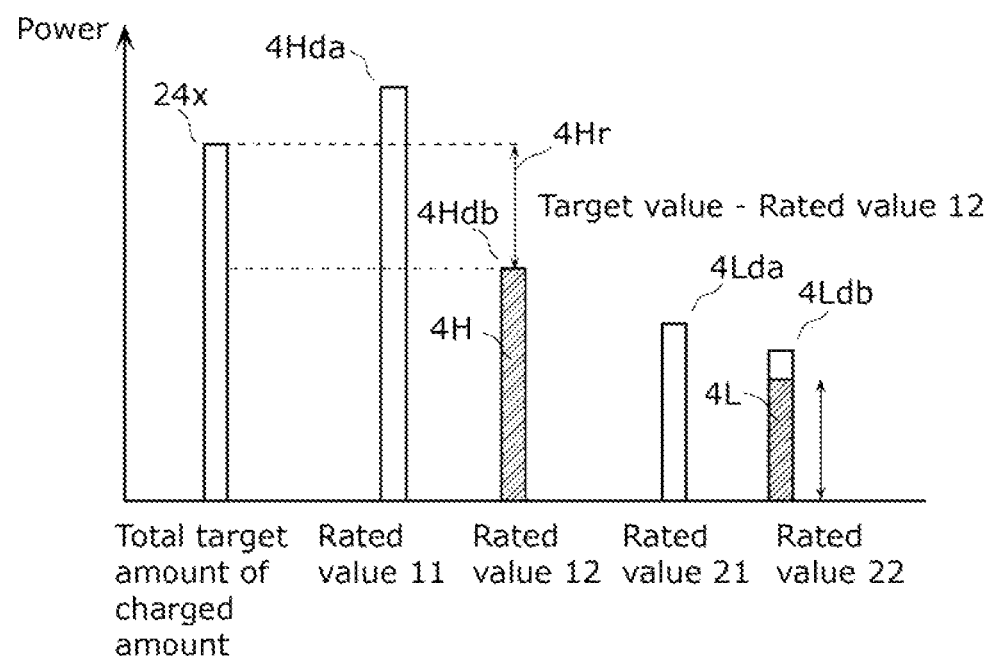
FIG. 12D depicts a conceptual diagram showing an outline of Embodiment 3.

The second case is the one where the power 24x of the total target value is (i) lower than or equal to the rated value 4Hda and (ii) higher than the rated value 4Hdb of the second power converter 312 (FIGS. 12C and 12D, S092: NO, and S093: YES).

Figure 12E:
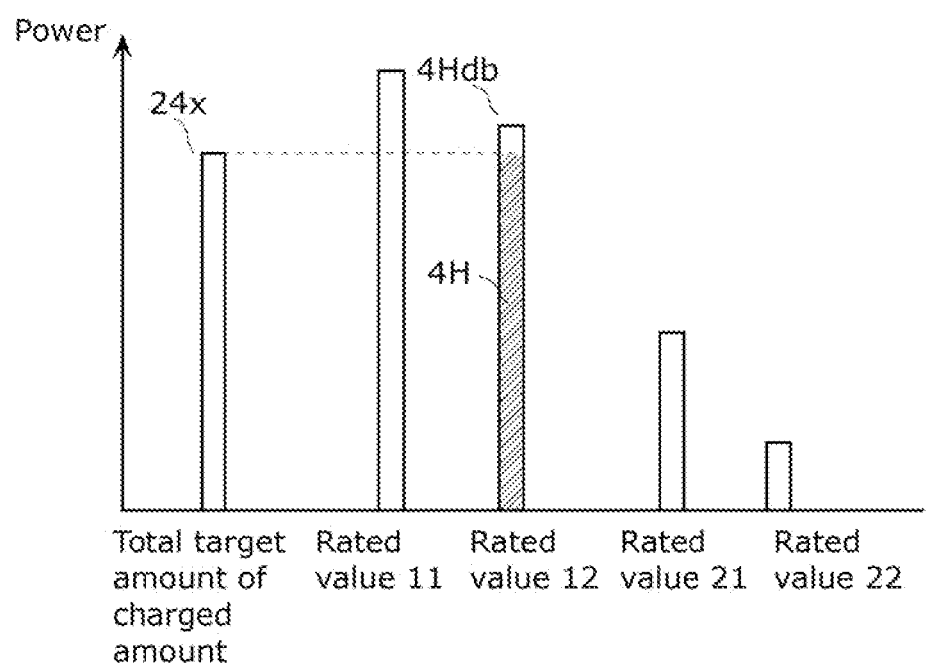
FIG. 12E depicts a conceptual diagram showing an outline of Embodiment 3.

The third case is the one where the power 24x of the total target value is lower than or equal to the rated value 4Hdb of the second power converter 312 (FIG. 12E, S092: NO, and S093: NO).

In S092 and S093, the charge control unit 22 determines one of the first to third cases.

Each of FIGS. 12A to 12E is a graph of power.

In S09c, in the case where the determination result shows that the third case—that is where the power 24× of the total target value is lower than or equal to the rated value 4Hdb of the second power converter 312 (S092: NO and S093: NO)— the control apparatus 13 determines to use only the first power converting unit 91t out of the first and second power converters 91t and 92t, and only the second power converter 312 out of the first and second power converters 311 and 312 included in the first power converting unit 91t (S09p and FIG. 12E). Then, the power 24× of the total target value is determined as power to be converted for storage by the second power converter 312 (S09p and FIG. 12E).

It is noted that the determined power in the third case does not have to be the power 24× of the total target value; instead, the determined power may be, for example, the power of the rated value of the second power converter 312.

In contrast, in the case of first and second cases in which the determination result shows that the power 24× of the total target value is not lower than the rated value 4Hdb of the second power converter 312 (S092: YES and S093: YES), the processing below is executed.

In other words, in the case where the determination result shows that the power 24× of the total target value is higher than the rated value 4Hda of the first power converter 312 (FIGS. 12A and 12B, and S032: YES), the control apparatus 13 determines to use the first power converting unit 91t and the first power converter 311 out of the first and second power converters 311 and 312 included in the first power converting unit 91t (S09d, and FIGS. 12A and 12B). Then, the rated value 4Hda of the first power converter 311 is determined as power to be converted for storage by the first power converter 311 (FIGS. 12A and 12B, and S09d).

Then, the control apparatus 13 determines whether or not the determined power 4Hr, (See FIGS. 12A and 12B, and "Target value−Rated value 11" stated in S09e) generated by subtracting the rated value 4Hda of the first power converter 311 from the power 24× of the total target value, is higher than a rated value 4Ldb of the second power converter 322 in the second power converting unit 92t (S09e).

Then, in the case where the determination result shows that the power 4Hr is higher than the rated value 4Ldb (S09e: YES), the control apparatus 13 determines to use the first power converter 321 in the second power converting unit 92t, as well as the first power converter 311 (FIG. 12A).

Here, power to be converted for storage by the first power converter 321 is the above power 4Hr generated by the subtraction (FIG. 12A).

In contrast, in the case where the determination result shows that the power 4Hr generated by subtracting the rated value 4Hda of the first power converter 311 from the power 24× of the total target value is lower than or equal to the rated value 4Ldb of the second power converter 322 (S09e: NO), the control apparatus 13 determines to use the second power converter 322 in the second power converting unit 92t, as well as the first power converter 311 (FIG. 12B)

Here, power to be converted for storage by the determined second power converter 322 is the above power 4Hr generated by the subtraction (FIG. 12B).

In contrast, in the second case where the power 24× of the total target value is (i) lower than or equal to the rated value 4Hda of the first power converter 312 and (ii) higher than the rated value 4Hdb (FIGS. 12C and 12D) of the second power converter 312 (FIGS. 12C and 12D, and S093: YES), the control apparatus 13 determines to use the first power converting unit 91t and the second power converter 312 in the first power converting unit 91t (S09j, and FIGS. 12C and 12D). Then, the control apparatus 13 determines the rated value 4Hdb of the second power converter 312 as power to be converted for storage by the second power converter 312 (FIGS. 12C and 12D, and S09j).

Then, the charge control unit 22 determines whether or not the determined power 4Hr, (See FIGS. 12C and 12D, and "Target value−Rated value 12" stated in S09k) generated by subtracting the rated value 4Hdb of the second power converter 312 from the power 24× of the total target value, is higher than the rated value 4Ldb of the second power converter 322 in the second power converting unit 92t (S09k).

Then, in the case where the determination result shows that the power 4Hr is higher than the rated value 4Ldb (S09k: YES), the control apparatus 13 determines to use the first power converter 321 in the second power converting unit 92t, as well as the second power converter 312 (FIGS. 12C and S091).

Here, power to be converted for storage by the determined first power converter 321 is the above power 4Hr generated by the subtraction (FIG. 12C).

In contrast, in the case where the determination result shows that the power 4Hr, generated by subtracting the rated value 4Hdb of the second power converter 312 from the power 24× of the total target value, is lower than or equal to the rated value 4Ldb of the second power converter 322 (S09k: NO), the control apparatus 13 determines to use the second power converter 322 in the second power converting unit 92t, as well as the second power converter 312 (FIG. 12D).

Here, determined power to be converted for storage by the second power converter 322 is the above power 4Hr generated by the subtraction (FIG. 12D).

Figure 11:
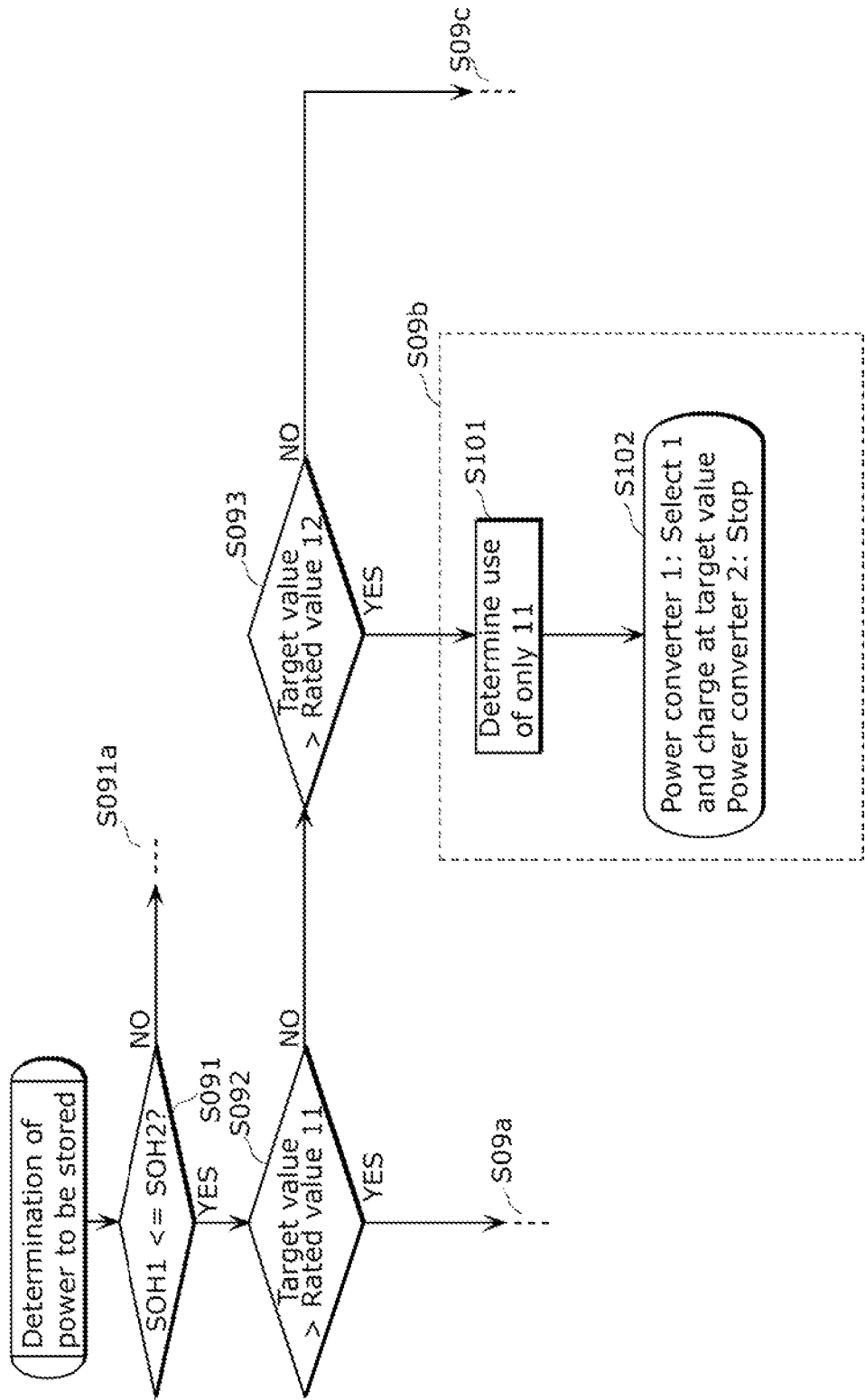
FIG. 11 depicts a flowchart exemplifying an operation of the control apparatus in determining power to be stored according to Embodiment 3.

FIG. 11 depicts a flowchart showing how the control apparatus 13 according to Embodiment 3 determines the power to be stored.

Then, as exemplary processing in S036 in FIG. 5, the processing shown in the flowchart in FIG. 11 may be executed.

In other words, in the case where the control apparatus 13 determines that the power 24× of the total target value is (i) equal to or lower than the rated value 4Hda of the first power converter 311 included in the first power converting unit 91t (S092: NO) and (ii) higher than the rated value 4Hdb of the second power converter 312 (S093: YES), the processing in S09b in FIG. 11 may be executed.

In the processing in S09b, specifically, the control apparatus 13 may determine to use only the first power converting unit 91t out of the first and second power converters 91t and 92t, and only the first power converter 311 included in the first power converting unit 91t (S101). Then, the power 24× of the total target value may be determined as power to be converted for storage by the first power converter 311.

Figure 13:
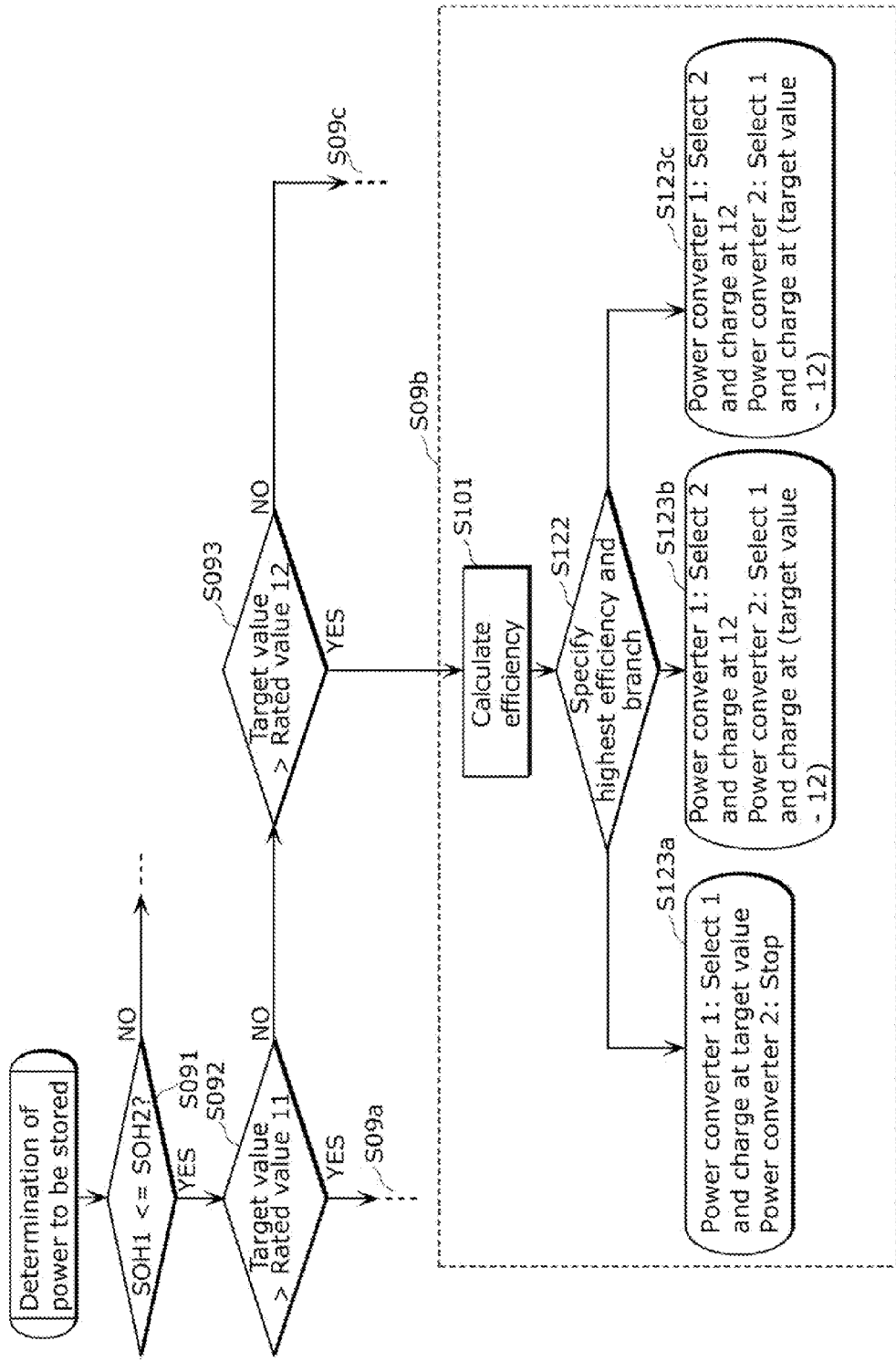
FIG. 13 depicts a flowchart exemplifying an operation of the control apparatus in determining power to be stored according to Embodiment 3.

FIG. 13 shows a flowchart showing processing executed based on efficiency to be calculated.

In other words, in the case where the control apparatus 13 determines that the power 24× of the total target value is (i) equal to or lower than the rated value 4Hda of the first power converter 311 included in the first power converting unit 91t (S092: NO) and (ii) higher than the rated value 4Hdb of the second power converter 312 (S093: YES), the processing in S09b in FIG. 11 may be executed.

Here, there are three kinds for charging a storage battery: As one or more chargers for use in the charge, (i) the kind in which only the first power converting unit 91t is available, (ii) the kind in which only the second power converting unit 92t is available, and (iii) the kind in which both of the first and second power converting units 91t and 92t are available.

Then, in each of the kinds, multiple power converters (the first and second power converters 311 and 312, and the first and second power converters 321 and 322) are used as the power converters for each of one or more of the power converting units in the kind.

In other words, the charge control unit 22 determines a kind of the charge and a combination of the power converters to be used in each of the power converting units for use in the kind.

Then, the charge control unit 22 determines power to be stored by each of the power converters for use in the combination.

In other words, the charge control unit 22 determines one or more units of power which are equal in number to the power converters to be used—that is the number of power converting units to be used.

It is noted that the determined sum of the one or more units of power is, for example, equal to the above-described power 24x of the total target value.

Hence, charging conditions which include the kinds of the charge, a combination of the power converters to be used, and power to be converted for storage by each of the power converters are determined.

Then, in S121 of S09b, the charge control unit 22 specifies, for each of the conditions included in one or more conditions, efficiency degrees to be achieved when power is stored under the each condition.

The specified efficiency includes, for example, an average value (or total value) of the efficiency degrees for power conversion performed by each of the power converters to be used for storing the power.

In S122, the charge control unit 22 specifies a condition in which the highest efficiency degree is specified among the one or more efficiency degrees specified in S121.

Hence, under the condition in which the highest efficiency degree is specified, a kind of charge, a combination of the power converters to be used, and power to be converted for storage by each of the power converters are determined (S123a to S123c).

It is noted that, for example, S123a in FIG. 13 shows the case where, under a condition to be determined, the kind of charge includes all the cases where only the first power converting unit 91t is used, the power converter to be used in the first power converting unit 91t is the first power converter 311, and the power to be converted for storage by the first power converter 311 is equal to the power 24x of the total target value.

Figure 14A:
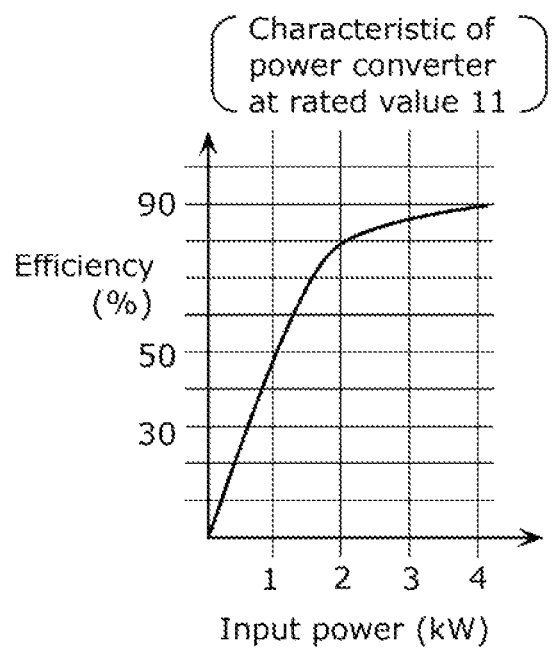
FIG. 14A depicts an efficiency characteristic of a power converter.
Figure 14B:
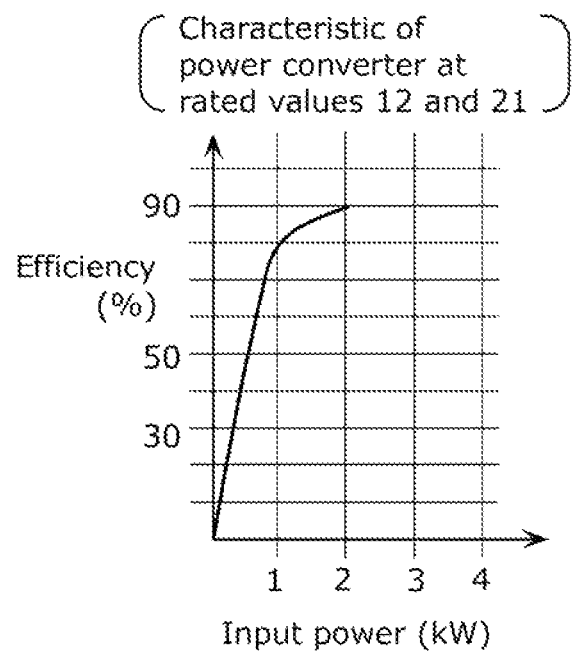
FIG. 14B depicts an efficiency characteristic of a power converter.
Figures 14C, 15A, 15B, 15C:
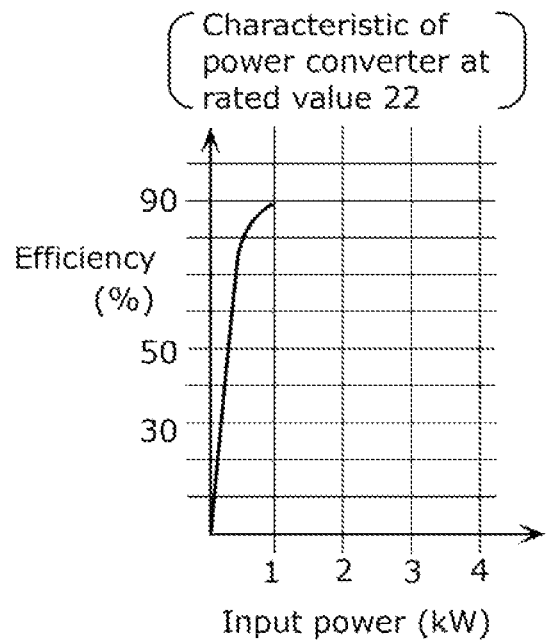
FIG. 14C depicts an efficiency characteristic of a power converter.
FIG. 15A depicts a table showing efficiency.
FIG. 15B depicts a table showing efficiency.
FIG. 15C depicts a table showing efficiency.

Each of FIGS. 14A to 14C depicts a graph showing power conversion efficiency of a power converter.

For example, the characteristic of the first power converter 311 in the first power converting unit 91t represents the efficiency illustrated in the graph of FIG. 14A.

Then, for example, each of the characteristic of the second power converter 312 in the first power converting unit 91t and the characteristic of the first power converter 321 in the second power converting unit 92t represents the efficiency illustrated in the graph of FIG. 14B.

Then, for example, the characteristic of the second power converter 322 in the second power converting unit 92t represents the efficiency illustrated in the graph of FIG. 14C.

Each of FIGS. 15A to 15C depicts a table showing power conversion efficiency of a power converter.

Each of FIGS. 15A to 15C respectively shows a table of the efficiency illustrated in a graph of FIGS. 14A to 14C.

Figure 16:
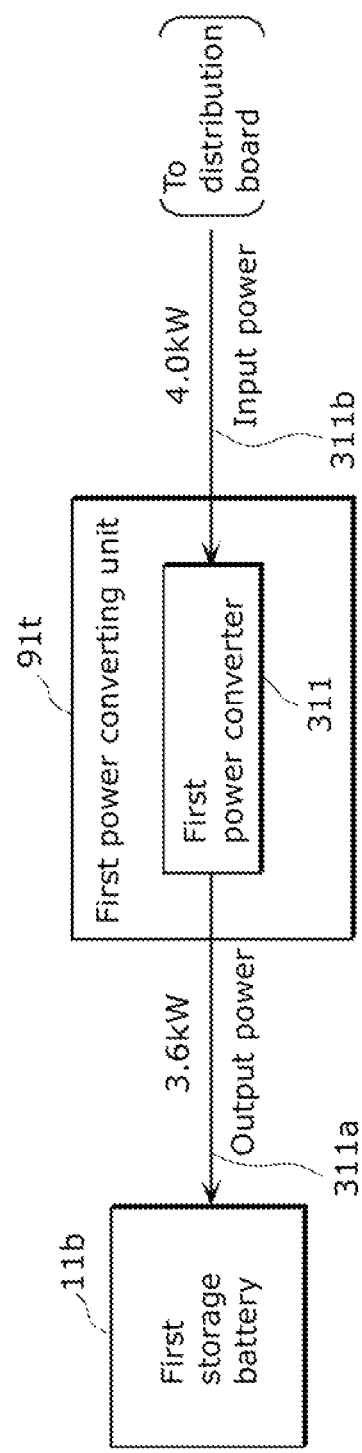
FIG. 16 shows a first power converting unit and a first storage battery.

FIG. 16 shows the storage battery 11b, the first power converting unit 91t and the like.

In each of the tables in FIGS. 15A to 15C, the column "output/input" shows output power 311a (FIG. 16) and input power 311b.

The input power 311b is power before conversion to be performed by a power converter (In the example of FIG. 16, the first power converter 311 in the first power converting unit 91t).

The output power 311a is power after conversion.

FIG. 17 shows efficiency and the like to be specified.

The field (a) of FIG. 17 exemplifies the case where the power 24x of the total target value is 3 kW (x=3). The field (b) in FIG. 17 exemplifies the case where the power 24x of the total target value is 2 kW (x=2).

For example, the row (1) in the field (a) of FIG. 17 shows the case below. In such a case, the following determination is made: a kind of charge is to use only the first power converting unit 91t; the first power converter 311 is a power converter for use in the power converting unit 91t; and the power to be converted for storage by the first power converter 311 is the same power of 3 kW as the power 24x of the total target value.

Then, the row (1) shows that the efficiency in this case incurs a loss of 0.4 kW.

Similarly, the row (2) shows that the efficiency under a condition different from the above one incurs a loss of 0.4 kW. The row (3) shows that the efficiency under a condition different from neither the condition in the row (1) nor the condition in the row (2) incurs a loss of 0.3 kW.

Under each of the three conditions in the rows (1) to (3), the efficiency is specified (S121 in FIG. 13). Among the efficiency in the conditions, the efficiency in the row (3) is specified to be the highest one (S122). Hence, the condition in the row (3) is determined as the one for charge.

The bottom line of the field (a) shows the statement which reads "Select (3) . . . ", and schematically shows that the condition in the row (3) is determined.

It is noted that the field (b) is similar to the above-described field (a), and the details thereof shall be omitted.

Figure 18A:
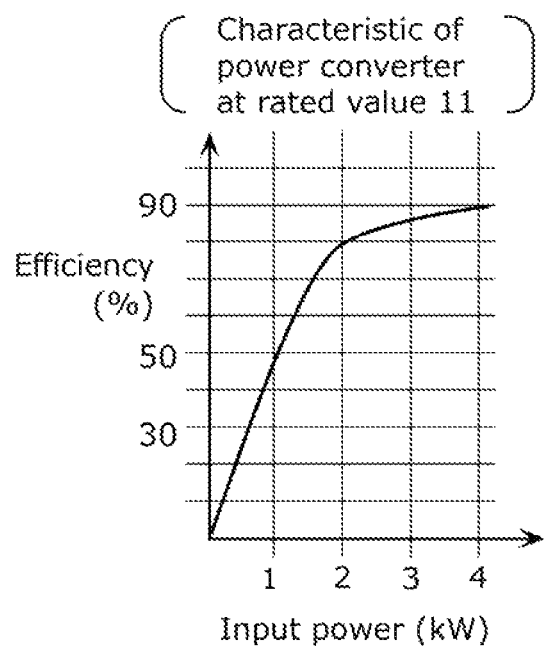
FIG. 18A depicts an efficiency characteristic of a power converter.
Figure 18B:
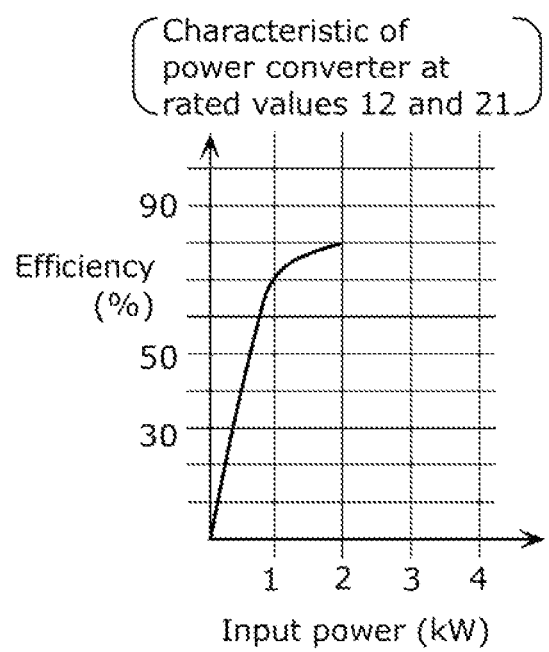
FIG. 18B depicts an efficiency characteristic of a power converter.
Figures 18C, 19A, 19B, 19C:
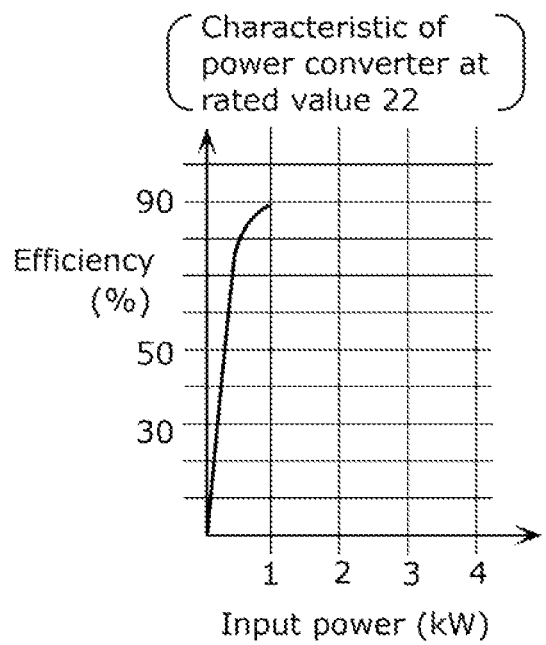
FIG. 18C depicts an efficiency characteristic of a power converter.
FIG. 19A depicts a table showing efficiency.
FIG. 19B depicts a table showing efficiency.
FIG. 19C depicts a table showing efficiency.

Each of FIGS. 18A to 18C depicts a graph showing power conversion efficiency of a power converter.

Each of FIGS. 19A to 19C depicts a table showing power conversion efficiency of a power converter.

FIG. 20 shows efficiency and the like to be specified.

Hence, the efficiency for each of the power converters does not have to be the one shown in FIGS. 14A to 14C and in FIGS. 15A to 15C. Instead, the efficiency may be the one shown in FIGS. 18A to 18C and in FIGS. 19A to 19C. Then, in the case where the efficiency is the one shown in FIGS. 18A to 18C and in FIGS. 19A to 19C, the processing shown in FIG. 13 may be executed (See FIG. 20).

Figure 21:
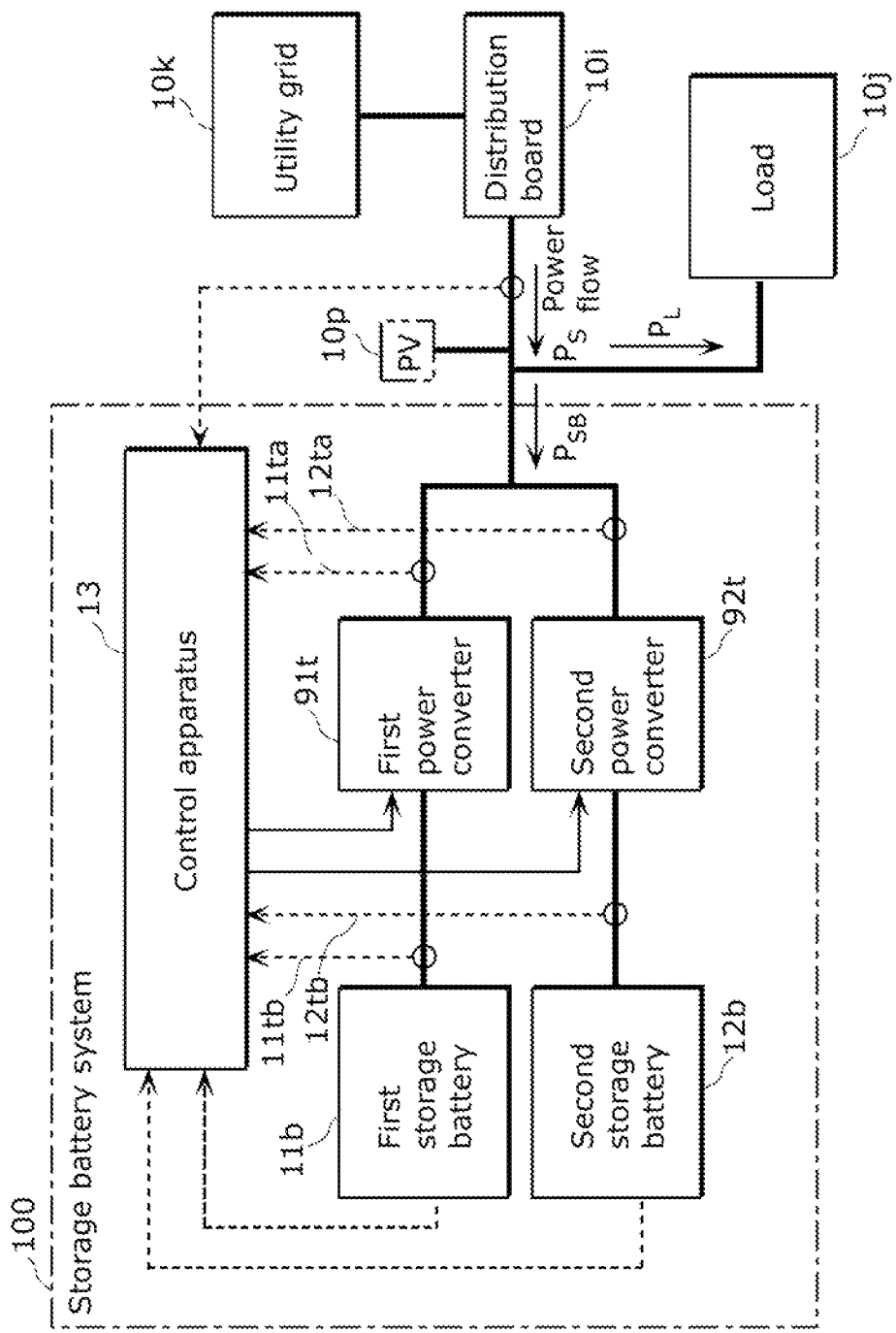
FIG. 21 depicts a system structure diagram of a power supply system according to Embodiment 3.

FIG. 21 shows information, such as information 11tb and 12tb on output power (the output power 311a in FIG. 16), and information 11ta and 12ta on input power (the input power 311b in FIG. 16).

The charge control unit 22 may obtain the information 11tb, 12tb, 11ta, and 12ta.

The information 11ta specifies the input power 311b provided to the first power converting unit 91t.

The information 11tb specifies the output power 311a provided to the first power converting unit 91t.

The information 12ta specifies the input power 311b provided to the second power converting unit 92t.

The information 12tb specifies the output power 311a provided to the second power converting unit 92t.

Then, the charge control unit 22 may specify, as power conversion efficiency of the first power converting unit 91t, the ratio of the output power 311a to the input power 311b (See FIGS. 15A to 15C, and FIG. 17). Here, the output power 311a is specified by the information 11tb, and the input power 311b is specified by the obtained information 11ta.

The charge control unit 22 may also specify, as power conversion efficiency of the second power converting unit 92t, the ratio of the output power 311a to the input power 311b. Here, the output power 311a is specified by the information 12tb, and the input power 311b is specified by the obtained information 12ta.

Based on, for example, the above-specified power conversion efficiency of each of the power conversion units (a power converter in the power converting unit), the charge control unit 22 may execute the above processing.

<Embodiment 4>

Figure 22:
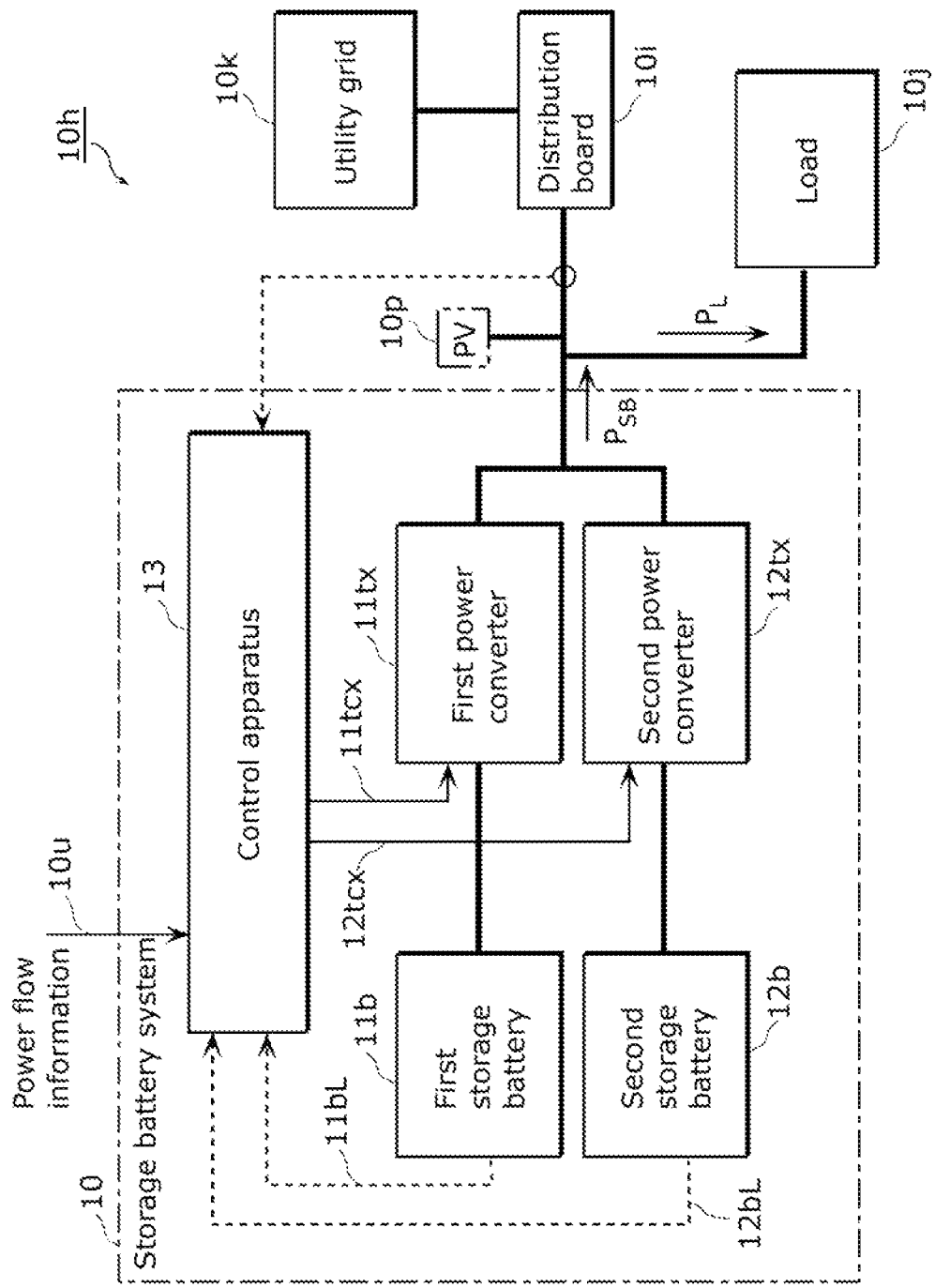
FIG. 22 depicts a system structure diagram of a power supply system according to Embodiment 4.

FIG. 22 depicts a system structure diagram of the storage battery system 10 according to Embodiment 4.

The storage battery system 10 includes a first power converter 11tx and a second power converter 12tx.

The first power converter 11tx converts power discharged from a first storage battery 11t according to an instruction.

The second power converter 12tx converts power discharged from a second storage battery 12t according to an instruction.

The first power converter 11tx and the second power converter 12tx may be, for example, a DC/DC converter, a DC/AC converter, an AC/DC converter, or a bi-directional inverter.

Deterioration of each of the storage batteries in discharge is relatively severe when the discharged power is relatively high first power. The deterioration is less severe when the discharged power is relatively low second power.

Hence, at the time of discharge, the storage battery system 10 may execute processing similar to the above-described processing executed at the time of charge.

For example, at the time of discharge, each of functional blocks, such as the charge control unit 22, may execute processing similar to the one executed at the time of charge.

For example, the charge control unit 22 may be a power control unit which executes both of the processing at the time of charge and the processing at the time of discharge. It is noted that each of other functional blocks, such as the target value obtaining unit 24, may operate in a similar manner as the power control unit.

It is noted that, as described above, each of the power converting units may include at least one power converter. For example, the rated value of the power converting units may be, for example, the highest of all the rated values of the power converters.

It is noted that, not only implemented in the form of an apparatus, a system, and an integrated circuit, the present invention may also be implemented in the form of a method including the processing units forming the apparatus as steps, a program causing a computer to execute such steps, a recording medium such as a computer-readable compact disc read only memory (CD-ROM) which records such a program, and information, data, and signals which indicate the program. The program, the information, the data, and the signals may be distributed via a communications network such as the Internet. The software to implement the power control apparatus in each of the embodiments is a program exemplified below.

The program causes a computer to execute: obtaining a total target value of power to be stored in storage batteries; obtaining information on a state of health for each of the storage batteries; and determining, for each of the storage batteries, how the power of the total target value is distributed and stored in each storage battery, wherein the determining including (i) comparing the state of health of a first storage battery and the state of health of a second storage battery and, in the case where the state of health of the second storage battery is higher than the state of health of the first storage battery, (ii) charging the second storage battery with second power lower than first power with which the first storage battery is charged, the first storage battery and the second storage battery being included in the storage batteries.

INDUSTRIAL APPLICABILITY

Each of the embodiments shows that the present invention is useful in determining power for storing or discharging power of the target value for each of storage batteries, based on a state of health (SOH) for each of the storage batteries.

REFERENCE SIGNS LIST

10 Storage battery system
11b First storage battery
11t First power converter
12b Second storage battery
12t Second power converter
13 Control apparatus
21 SOH obtaining unit
22 Charge control unit
24 Target value obtaining unit
26 Rated value information obtaining unit

The invention claimed is:

1. A power control apparatus comprising:
a first obtainer that obtains a target value of power to be stored in a plurality of storage batteries including a first storage battery and a second storage battery, the target value being a value which the power to be stored in the plurality of storage batteries is regulated to;
a second obtainer that obtains information on a state of health of each of the storage batteries;
storage that stores rated value information of a power converter which regulates power supplied from outside to obtain predetermined power and charges at least one of the storage batteries with the predetermined power; and
a charge controller that, in the case where the first storage battery is lower in state of health than the second storage battery, (i) compares the target value with a rated value of a first charging power converter for charging the first storage battery, (ii) causes the first storage battery to store power up to the target value in the case where the rated value of the first charging power converter is higher than the target value, and (iii) causes the first storage battery to store power up to the rated value, under the target value, of the first charging power converter and the second storage battery to store differential power between the target value and the rated value of the first charging power converter in the case where the rated value of the first charging power converter is lower than the target value,
wherein the rated value information indicates a maximum value of power to be stored in at least one of the storage batteries according to power conversion by the first charging power converter.

2. The power control apparatus according to claim 1, wherein the first storage battery is connected to power converters including the first charging power converter and having different rated values, and in the case where one or more power converters, included in the power converters and having rated values lower than the target value, are connected to the first storage battery, the charge controller selects, as the first charging power converter, one of the one or more power converters whose rated value is closest to the target value.

3. The power control apparatus according to claim 2, wherein in the case where only one or more power converters, included in the power converters and having rated values higher than the target value, are connected to the first storage battery, the charge controller selects, as the first charging power converter, one of the one or more power converters whose rated value is closest to the target value.

4. The power control apparatus according to claim 2, wherein the second storage battery is connected to power converters having different rated values, and in the case where the rated value of the first charging power converter is lower than the target value, the charge controller charges the second storage battery, using one of the power converters connected to the second storage battery, the one power converter having a rated value (i) higher than the differential power between the target value and the rated value of the first charging power converter, and (ii) closest to the differential power.

5. The power control apparatus according to claim 1, wherein the first storage battery is connected to power converters including the first charging power converter and having different rated values, the storage further stores an efficiency characteristic for each of the power converters connected to the first storage battery, the efficiency characteristic indicating efficiency in converting power provided to each of the power converters, and the charge controller selects, as the first charging power converter, one of the power converters which has highest efficiency in converting power to be stored in the first storage battery.

6. The power control apparatus according to claim 5, wherein the second storage battery is connected to power converters having different rated values, the storage further stores the efficiency characteristic for each of the power converters connected to the second storage battery, and in the case where the rated value of the first charging power converter is lower than the target value, the charge controller charges the second storage battery, using one of the power converters connected to the second storage battery, the one power converter having highest efficiency in converting the differential power between the target value and the rated value of the first charging power converter.

7. The power control apparatus according to claim 1, wherein the information on the state of health of each of the storage batteries is indicated in SOH, and the second storage battery is higher in SOH than the first storage battery.

8. A power control method for a power control apparatus which controls charge of storage batteries including a first storage battery and a second storage battery, the power control apparatus including storage that stores rated value information of a power converter which regulates power supplied from outside to obtain predetermined power and charges at least one of the storage batteries with the predetermined power, the power control apparatus obtaining: a target value of power to be stored in the storage batteries, the target value being a value which the power to be stored in the storage batteries is regulated to; and information on a state of health of each of the storage batteries, and the power control method comprising in the case where the first storage battery is lower in state of health than the second storage battery, (i) comparing the target value with a rated value of a first charging power converter for charging the first storage battery, (ii) causing the first storage battery to store power up to the target value in the case where the rated value of the first charging power converter is higher than the target value, and (iii) causing the first storage battery to store power up to the rated value, under the target value, of the first charging power converter and the second storage battery to store differential power between the target value and the rated value of the first charging power converter in the case where the rated value of the first charging power converter is lower than the target value, wherein the rated value information indicates a maximum value of power to be stored in at least one of the storage batteries according to power conversion by the first charging power converter.

9. A storage battery unit comprising:

storage batteries including a first storage battery and a second storage battery;

a first obtainer that obtains a target value of power to be stored in the storage batteries, the target value being a value which the power to be stored in the storage batteries is regulated to;

a second obtainer that obtains information indicating a state of health for each of the storage batteries;

power converters each (i) provided to a corresponding one of the storage batteries and (ii) which regulate power supplied from outside to obtain predetermined power and charge the corresponding storage battery with the predetermined power;

storage that stores rated value information of each of the power converters; and a charge controller that, in the case where the first storage battery is lower in state of health than the second storage battery, (i) compares the target value with a rated value of a first charging power converter, among the power converters, for charging the first storage battery, (ii) causes the first storage battery to store power up to the target value in the case where the rated value of the first charging power converter is higher than the target value, and (iii) causes the first storage battery to store power up to the rated value, under the target value, of the first charging power converter and the second storage battery to store differential power between the target value and the rated value of the first charging power converter in the case where the rated value of the first charging power converter is lower than the target value, wherein the rated value information indicates a maximum value of power to be stored in at least one of the storage batteries according to power conversion by the first charging power converter.

10. A power control apparatus comprising:

a first obtainer that obtains a target value of power to be discharged from storage batteries including a first storage battery and a second storage battery;

a second obtainer that obtains information indicating a state of health for each of the storage batteries;

storage that stores rated value information of a power converter which regulates power supplied from at least one of the storage batteries to obtain predetermined power and discharges the predetermined power to outside; and a discharge controller that, in the case where the first storage battery is lower in state of health than the second storage battery, (i) compares the target value with a rated value of a first discharging power converter for discharging power from the first storage battery, (ii) causes the first storage battery to discharge power up to the target value in the case where the rated value of the first discharging power converter is higher than the target value, and (iii) causes the first storage battery to discharge power up to the rated value, under the target value, of the first discharging power converter and the second storage battery to discharge differential power between the target value and the rated value of the first discharging power converter in the case where the rated value of the first discharging power converter is lower than the target value, wherein the rated value information indicates a maximum value of power to be discharged from at least one of the of the storage batteries according to power conversion by the first discharging power converter.

11. A non-transitory computer-readable recording medium having a computer program recorded thereon, the computer program being executed on a power control apparatus that controls charge of storage batteries including a first storage battery and a second storage battery, the power control apparatus including storage that stores rated value information of a power converter which regulates power supplied from outside to obtain predetermined power and charges at least one of the storage batteries with the predetermined power, and the computer program causing the power control apparatus to execute:

obtaining a target value of power to be stored in the storage batteries, the target value being a value which the power to be stored in storage batteries is regulated to;

obtaining information indicating a state of health for each of the storage batteries; and in the case where the first storage battery is lower in state of health than the second storage battery, (i) comparing the target value with a rated value of a first charging power converter for charging the first storage battery, (ii) causing the first storage battery to store power up to the target value in the case where the rated value of the first charging power converter is higher than the target value, and (iii) causing the first storage battery to store power up to the rated value, under the target value, of the first charging power converter and the second storage battery to store differential power between the target value and the rated value of the first charging power converter in the case where the rated value of the first charging power converter is lower than the target value, wherein the rated value information indicates a maximum value of power to be stored in at least one of the storage batteries according to power conversion by the first charging power converter.

12. An integrated circuit comprising:

a first obtainer that obtains a target value of power to be stored in storage batteries including a first storage battery and a second storage battery, the target value being a value which the power to be stored in the storage batteries is regulated to;

a second obtainer that obtains information on a state of health of each of the storage batteries;

storage that stores rated value information of a power converter which regulates power supplied from outside to obtain predetermined power and charges at least one of the storage batteries with the predetermined power; and a charge controller that, in the case where the first storage battery is lower in state of health than the second storage battery, (i) compares the target value with a rated value of a first charging power converter for charging the first storage battery, (ii) causes the first storage battery to store power up to the target value in the case where the rated value of the first charging power converter is higher than the target value, and (iii) causes the first storage battery to store power up to the rated value, under the target value, of the first charging power converter and the second storage battery to store differential power between the target value and the rated value of the first charging power converter in the case where the rated value of the first charging power converter is lower than the target value, wherein the rated value information indicates a maximum value of power to be stored in at least one of the of the storage batteries according to power conversion by the first charging power converter.

* * * * *